(12) United States Patent
Maturana et al.

(10) Patent No.: US 9,843,617 B2
(45) Date of Patent: Dec. 12, 2017

(54) CLOUD MANIFEST CONFIGURATION MANAGEMENT SYSTEM

(71) Applicant: Rockwell Automation Technologies, Inc., Mayfield Heights, OH (US)

(72) Inventors: Francisco P. Maturana, Lyndhurst, OH (US); Juan L. Asenjo, Timberlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 150 days.

(21) Appl. No.: 14/525,144

(22) Filed: Oct. 27, 2014

(65) Prior Publication Data

US 2015/0281319 A1 Oct. 1, 2015

Related U.S. Application Data

(60) Provisional application No. 61/970,798, filed on Mar. 26, 2014.

(51) Int. Cl.
*G06F 15/16* (2006.01)
*H04L 29/08* (2006.01)
(Continued)

(52) U.S. Cl.
CPC .............. *H04L 67/02* (2013.01); *G05B 19/18* (2013.01); *G05B 19/4185* (2013.01);
(Continued)

(58) Field of Classification Search
CPC . H04L 67/1097; H04L 67/2828; G06F 9/548; G06F 9/5072
See application file for complete search history.

(56) References Cited

U.S. PATENT DOCUMENTS 5,519,605 A   5/1996 Cawlfield
6,230,010 B1  5/2001 Morris
(Continued)

FOREIGN PATENT DOCUMENTS

CN   1755564   4/2006
CN   1937559   3/2007
(Continued)

OTHER PUBLICATIONS

Extended European Search Report for EP Application Serial No. 15160989.8, dated Sep. 22, 2016, 5 pages.
(Continued)

*Primary Examiner* — Michael A Keller
(74) *Attorney, Agent, or Firm* — Amin, Turocy & Watson, LLP

(57) ABSTRACT

Cloud-based data processing services facilitate collection and processing of industrial data in a cloud platform. On-premise data collection agents collect and pre-process industrial data from one or more data sources, including industrial devices, historians, etc. The agents apply a header to the data defining a hierarchical, customer-specific data model that can be leveraged in the cloud platform to suitably process the data. Cloud-side data process services receive the resulting data packets, assign the data to one or more priority queues, and invoke a manifest assembly corresponding to the data model defined by the header. The manifest assembly defines one or more operations to be performed on the received data, including specifying a final storage destination for the data, determining one or more metrics for an industrial system or process based on the received data, or other such operations.

20 Claims, 23 Drawing Sheets

(51) Int. Cl.
*G06F 9/50* (2006.01)
*G06F 9/54* (2006.01)
*G05B 19/18* (2006.01)
*H04L 12/863* (2013.01)
*G05B 19/418* (2006.01)

(52) U.S. Cl.
CPC .............. *G06F 9/5072* (2013.01); *G06F 9/54* (2013.01); *H04L 47/50* (2013.01); *Y02P 90/18* (2015.11)

(56) References Cited

U.S. PATENT DOCUMENTS

| | | | |
|---|---|---|---|
| 6,609,034 | B1 | 8/2003 | Behrens et al. |
| 6,640,241 | B1 | 10/2003 | Ozzie et al. |
| 6,675,226 | B1 | 1/2004 | Nair et al. |
| 7,133,908 | B1 | 11/2006 | Pajak et al. |
| 7,159,209 | B1* | 1/2007 | Srinivasan .......... G06F 11/0751 707/999.1 |
| RE39,989 | E | 1/2008 | Morris |
| 7,676,287 | B2 | 3/2010 | Eryurek et al. |
| 8,219,216 | B2 | 7/2012 | Klug et al. |
| 8,275,847 | B2 | 9/2012 | Lewis |
| 2003/0014387 | A1 | 1/2003 | Kreidler et al. |
| 2003/0083754 | A1 | 5/2003 | Tripathi et al. |
| 2003/0212818 | A1* | 11/2003 | Klein .................. H04L 51/12 709/238 |
| 2004/0141517 | A1 | 7/2004 | Balasubramanian et al. |
| 2004/0230859 | A1 | 11/2004 | Cochran et al. |
| 2005/0010333 | A1 | 1/2005 | Lorton et al. |
| 2005/0154477 | A1 | 7/2005 | Martin et al. |
| 2005/0193285 | A1* | 9/2005 | Jeon .................... G06F 11/0709 714/48 |
| 2006/0068762 | A1 | 3/2006 | Baldwin et al. |
| 2006/0294047 | A1 | 12/2006 | Johnston et al. |
| 2007/0019641 | A1 | 1/2007 | Pai et al. |
| 2008/0168092 | A1 | 7/2008 | Boggs et al. |
| 2008/0317058 | A1 | 12/2008 | Williams |
| 2009/0183201 | A1* | 7/2009 | Dasgupta ................. G09B 7/00 725/40 |
| 2009/0198350 | A1 | 8/2009 | Thiele |
| 2009/0265036 | A1 | 10/2009 | Jamieson et al. |
| 2009/0326892 | A1 | 12/2009 | Lin |
| 2010/0070852 | A1 | 3/2010 | Li |
| 2010/0256794 | A1 | 10/2010 | McLaughlin et al. |
| 2010/0256795 | A1* | 10/2010 | McLaughlin ...... G05B 19/4183 700/110 |
| 2010/0257228 | A1 | 10/2010 | Staggs et al. |
| 2011/0066298 | A1 | 3/2011 | Francino et al. |
| 2011/0103393 | A1 | 5/2011 | Meier et al. |
| 2011/0134930 | A1 | 6/2011 | McLaren et al. |
| 2011/0145836 | A1 | 6/2011 | Wheeler et al. |
| 2012/0143378 | A1 | 6/2012 | Spears et al. |
| 2012/0166963 | A1 | 6/2012 | Kohli et al. |
| 2012/0232869 | A1 | 9/2012 | Maturana et al. |
| 2012/0331104 | A1 | 12/2012 | Akiyama et al. |
| 2013/0067090 | A1 | 3/2013 | Batrouni et al. |
| 2013/0081146 | A1 | 3/2013 | Hakozaki |
| 2013/0110298 | A1 | 5/2013 | Beveridge |
| 2013/0123965 | A1 | 5/2013 | Cooper et al. |
| 2013/0124253 | A1 | 5/2013 | Cooper et al. |
| 2013/0150986 | A1 | 6/2013 | Timsjo et al. |
| 2013/0191106 | A1 | 7/2013 | Kephart et al. |
| 2013/0211559 | A1 | 8/2013 | Lawson et al. |
| 2013/0211870 | A1 | 8/2013 | Lawson et al. |
| 2013/0212420 | A1 | 8/2013 | Lawson et al. |
| 2013/0225151 | A1 | 8/2013 | King et al. |
| 2013/0227446 | A1 | 8/2013 | Zala et al. |
| 2013/0262678 | A1 | 10/2013 | Tung et al. |
| 2013/0266193 | A1* | 10/2013 | Tiwari ............... G06K 9/00771 382/115 |
| 2013/0269020 | A1 | 10/2013 | Griffin et al. |
| 2013/0283151 | A1* | 10/2013 | Deguzman ........ G06F 17/30905 715/239 |
| 2013/0290952 | A1* | 10/2013 | Childers, Jr. ......... G06F 9/5077 718/1 |
| 2014/0047064 | A1 | 2/2014 | Maturana et al. |
| 2014/0047107 | A1 | 2/2014 | Maturana et al. |
| 2014/0115592 | A1 | 4/2014 | Frean et al. |
| 2014/0156234 | A1 | 6/2014 | Maturana et al. |
| 2014/0164124 | A1 | 6/2014 | Rhoads |
| 2014/0207868 | A1 | 7/2014 | Gordon et al. |
| 2014/0257528 | A1 | 9/2014 | Perez et al. |
| 2014/0269531 | A1 | 9/2014 | Luna et al. |
| 2014/0274005 | A1 | 9/2014 | Luna et al. |
| 2014/0280796 | A1 | 9/2014 | Pijewski |
| 2014/0282015 | A1 | 9/2014 | Nixon et al. |
| 2014/0337473 | A1 | 11/2014 | Frusina et al. |
| 2015/0220080 | A1 | 8/2015 | Nixon et al. |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |

OTHER PUBLICATIONS

Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
European Office Action for EP Application Serial No. 15160988.0, dated Oct. 24, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
Steiner, J. G., et al., "Kerberos: An Authentication Service for Open Network Systems," Proceedings of the Winter Usenix Conference, Feb. 9, 1988, pp. 191-202.
Office Action for U.S. Appl. No. 14/525,131, dated Jun. 28, 2016, 36 pages.
Office Action for U.S. Appl. No. 14/665,128, dated Jul. 20, 2016, 9 pages.

(56) References Cited

OTHER PUBLICATIONS

Office Action for U.S. Appl. No. 14/634,174, dated Aug. 4, 2016, 11 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Office Action for U.S. Appl. No. 14/562,233, dated Jan. 25, 2017, 25 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Office Action for U.S. Appl. No. 14/525,131, dated Feb. 3, 2017, 21 pages.
Office Action for U.S. Appl. No. 14/639,279, dated Feb. 10, 2017, 110 pages.
Chinese Office Action and English Translation thereof dated Jul. 12, 2017, for Chinese Application Serial No. 201510138210.1, 17 pages.
Final Office Action for U.S. Appl. No. 14/639,279, dated Aug. 9, 2017, 66 pages.
Final Office Action for U.S. Appl. No. 14/562,233, dated Jul. 28, 2017, 33 pages.
Office Action for U.S. Appl. No. 14/525,149 dated Oct. 5, 2017, 88 pages.
Office Action for U.S. Appl. No. 15/431,128 dated Oct. 18, 2017, 37 pages.

* cited by examiner

```xml
<Manifest xmlns:xsd="http://www.w3.org/2001/XMLSchema"
    xmlns:xsi="http://www.w3.org/2001/XMLSchema-instance">
    <ReleaseDate>2012-05-30T17"16:07.6290869-05:00</ReleaseDate>
    <MetricManifest>F:\\Shweta_Development\\Manifest\\MetricsManifest.xml</MetricManifest>
  -<Customers>
   -<Customer>
      <CustomerName>Rockwell CMS</CustomerName>
      <CustomerId>1001</CustomerId>
      -<Sites>
       -<Site>
          <SiteId>101</SiteId>
          <SiteName>Rockwell Office</SiteName>
         -<VSEs>
          -<VSE>
             <VSEId>1</VSEId>
             <VSEName>Test Machine</VSEName>
             <VSETagManifest>F:\\Shweta_Development\\Manifest\\TagManifest.xml</VSETagManifest>
            -<MessageTypes>
             -<MessageType>
                <MessageTypeName>Alarms</MessageTypeName>
                <MessageTypeId>0</MessageTypeId>
               -<AssemblyInfo>
                -<ProcessAssembly>
                   <ProcessId>100011</ProcessId>

<Namespace>CoreProcessAssembly.AlarmDataProcess</Namespace>

<AssemblyFileName>CoreProcessAssembly.dll</AssemblyFileName>
                   <ReleaseDate>2012-05-30T17:16:08.2760869-05:00</ReleaseDate>
                </ProcessAssembly>
               </AssemblyInfo>
             </MessageType>
             -<MessageType>
               <MessageTypeName>Historical</MessageTypeName>
               <MessageTypeId>1</MessageTypeId>
              -<AssemblyInfo>
               -<ProcessAssembly>
                  <ProcessId>100011</ProcessId>

<Namespace>CoreProcessAssembly.HistoricalDataProcess</Namespace>
```

FIG. 10

```
<TagManifestReleaseDate="2012-05-30T017:16:07.6298869-05:00">
-<AnalyticsSystem>
  -<ControlSystems>
    -<ControlSystem ID = "1">                        ←―1106
      -<Controllers>
        <Controller ID = "1.0" Project= "chassis1" connnectedTo = "N1" / >
        <Controller ID = "2.0" Project= "modularPLC" connnectedTo = "N2" / >
      </Controllers>
      -<Networks>
        <Network ID = "N1" Name = "TestNetwork1"/ >
        <Network ID = "N2" Project = "TestNetwork2"/ >
      </Networks>
    </ControlSystem>
    + <ControlSystem ID = "1">
  </ControlSystems>
-<Applications>                        ←―1108
  -<Application ID = "1.1" Name = "TurboExpander1">
    -<Process>
        <Process ID = "1" Name = "NetPower" />        ←―1104
        <Process ID = "2" Name = "CycleEfficiency" />
        <Process ID = "3" Name = "PowerGuarantee" />
    </Process>
  </Application>
  + <Application ID = "1.2" Name = "TurboExpander2">
  + <Application ID = "1.3" Name = "TurboExpander3">
</Applications>                                                      ←―1102
-<Tags>
    <Tag Name = "GEN_REAL_POWER" Units = "MW" ownerProcessID = "1,2,3" ownerControllerID = "1.0" / >
    <Tag Name = "MW_TOTAL_480_SUPPLY" Units = "MW" ownerProcessID = "1,2,3" ownerControllerID = "2.0" / >
    <Tag Name = "WHRU_1_T_OIL_OUTLET_FLOW" Units = "m2/hr" ownerProcessID = "2,3" ownerControllerID = "1.0" / >
    <Tag Name = "WHRU_1_T_OIL_IN_TEMP" Units = "C" ownerProcessID = "3" ownerControllerID = "2.0" / >
    <Tag Name = "WHRU_1_T_OIL_OUTLET_TEMP" Units = "C" ownerProcessID = "2,3" ownerControllerID = "1.0" / >
    <Tag Name = "WHRU_2_T_OIL_OUTLET_FLOW" Units = "m3/hr" ownerProcessID = "2,3" ownerControllerID = "2.0" / >
    <Tag Name = "WHRU_2_T_OIL_IN_TEMP" Units = "C" ownerProcessID = "2" ownerControllerID = "2.0" / >
    <Tag Name = "WHRU_1_T_OIL_OUTLET_TEMP" Units = "C" ownerProcessID = "2,3" ownerControllerID = "1.0" / >
    <Tag Name = "AMBIENT_AIR_TEMP" Units = "C" ownerProcessID = "3" ownerControllerID = "1.0" / >
    <Tag Name = "T_OIL_SUPPLY_TO_ORC_TEMP" Units = "C" ownerProcessID = "3" ownerControllerID = "1.0" / >
    <Tag Name = "T_OIL_SUPPLY_RETURN_FROM_ORC_TEMP" Units = "C" ownerProcessID = "3" ownerControllerID =
    "2.0" / >
</Tags>
</AnalyticsSystem>
</TagManifest>
```

CLOUD MANIFEST CONFIGURATION MANAGEMENT SYSTEM

CROSS-REFERENCE TO RELATED APPLICATIONS

This application claims priority to U.S. Provisional Application Ser. No. 61/970,798, filed on Mar. 26, 2014, entitled "INDUSTRIAL CLOUD INFRASTRUCTURE FOR DATA INGESTION, MODELING, PROCESSING, ANALYTICS, AND REPORTING," the entirety of which is incorporated herein by reference.

BACKGROUND

The subject matter disclosed herein relates generally to industrial data collection, and, more particularly, to an on-premise cloud agent that facilitates collection and upload of industrial data to a cloud-based storage and processing infrastructure.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for processing industrial data in a cloud platform is provided, comprising a queue management component configured to receive, at a cloud platform, a data packet from a cloud agent device residing at an industrial facility and assign industrial data contained in the data packet to a priority queue in the cloud platform, a manifest assembly repository configured to maintain a set of manifest assemblies that respectively define operations to be performed on industrial data received at the cloud platform, and a worker role component configured to identify a manifest assembly, of the set of manifest assemblies, based on header information contained in the data packet, and to process the industrial data in the priority queue in accordance with the manifest assembly.

Also, one or more embodiments provide a method for collecting and managing data in a cloud platform, comprising receiving, at a cloud platform by a system comprising at least one processor, a data packet from a data collection device located at an industrial plant, wherein the data packet comprises a data file containing industrial data and a header; assigning the industrial data to a priority queue on the cloud platform; identifying a manifest assembly, of a plurality of manifest assemblies stored in a manifest repository of the cloud platform, based on information read from the header; and processing the industrial data in the priority queue in accordance with the manifest assembly.

Also, according to one or more embodiments, a non-transitory computer-readable medium is provided having stored thereon instructions that, in response to execution, cause a system to perform operations, the operations, comprising receiving, at a cloud platform, a data packet from a cloud agent device residing at an industrial site, wherein the data packet comprises a data file containing industrial data and header information; assigning the industrial data to a priority queue on the cloud platform; selecting, based on the header information, a manifest assembly from a plurality of

2 manifest assemblies stored in a manifest repository of the cloud platform; and processing the industrial data in the priority queue according to processing instructions specified by the manifest assembly.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 10 is a portion of an example system manifest.

FIG. 11 is a portion of an example tag manifest.

DETAILED DESCRIPTION

Figure 1:
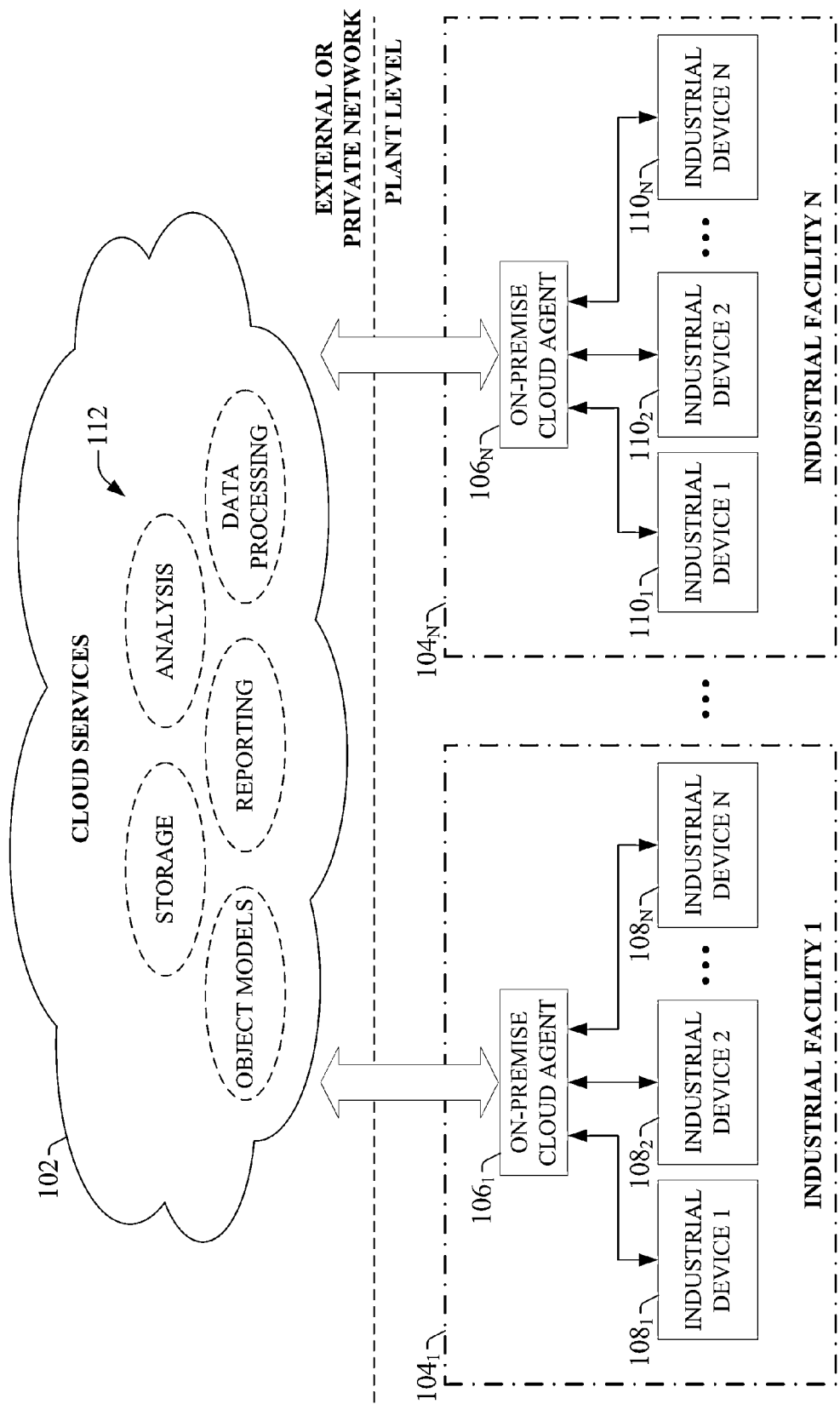
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

To address these and other issues, one or more embodiments of the present disclosure provide a cloud computing platform architecture that facilitates remote collection, storage, and processing of industrial data. The platform uses an agent-based architecture to gather industrial data from data sources at all levels of an industrial enterprise, including but not limited to industrial devices (e.g., controllers, drives, telemetry devices, etc.), data historians, data tables, business-level systems (e.g. enterprise resource planning systems, manufacturing execution systems, accounting systems, etc.), and other such data source. The cloud-based infrastructure can intelligently sort and organize the acquired data into priority message queues. Worker roles executing on the cloud platform determine how the queued data is to be processed based on manifests (e.g., system manifests, tag manifests, and metric manifests) stored in a customer-specific manifest assembly. Manifests define and implement customer-specific capabilities, applications, and preferences for processing collected data in the cloud.

FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments, on-premise cloud agents 106 can collect data from industrial devices 108 and 110—or from other data sources, including but not limited to data historians, business-level systems, etc.—and send this data to cloud platform 102 for processing and storage. Cloud platform 102 can be any infrastructure that allows cloud services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the manifest system described herein) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of real-time system data or other factors), visualization applications such as the cloud-based operator interface system described herein, reporting applications, Enterprise Resource Planning (ERP) applications, notification services, or other such applications. Cloud platform 102 may also include one or more object models to facilitate data ingestion and processing in the cloud. If cloud platform 102 is a web-based cloud, cloud agents 106 at the respective industrial facilities 104 may interact with cloud services 112 directly or via the Internet. In an exemplary configuration, the industrial devices 108 and 110 connect to the on-premise cloud agents 106 through a physical or wireless local area network or radio link. In another exemplary configuration, the industrial devices 108 and 110 may access the cloud platform 102 directly using integrated cloud agents. Cloud agents and their associated data collection and processing services are discussed in more detail below.

Ingestion of industrial device data in the cloud platform 102 through the use of cloud agents 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud agents 106 can be configured to automatically detect and communicate with the cloud platform 102 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Figure 2:
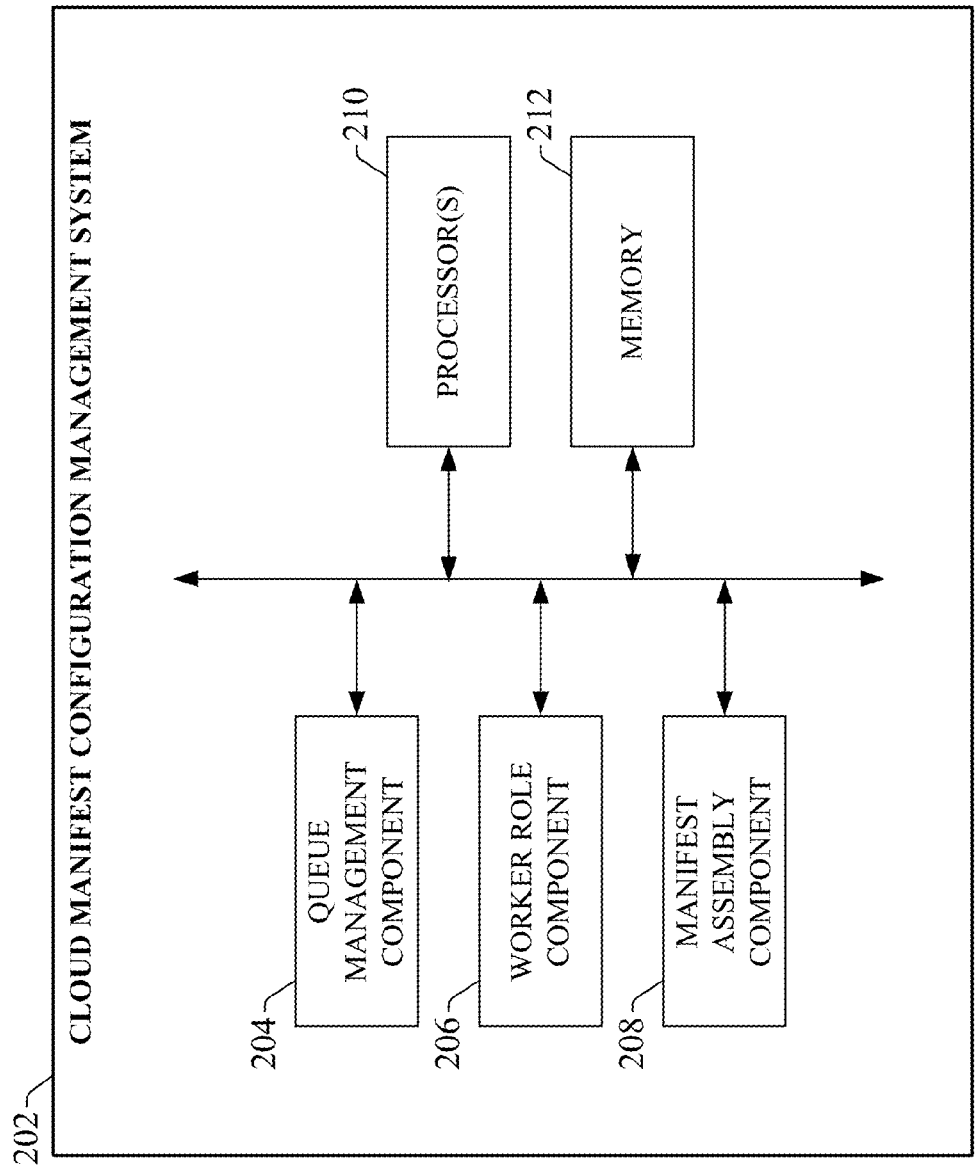
FIG. 2 is a block diagram of an example cloud manifest configuration management system.

FIG. 2 is a block diagram of an example cloud manifest configuration management system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud manifest configuration management system 202 can include a queue management component 204, a worker role component 206, a manifest assembly component 208, one or more processors 210, and memory 212. In various embodiments, one or more of the queue management component 204, worker role component 206, manifest assembly component 208, the one or more processors 210, and memory 212 can be electrically and/or communicatively coupled to one another to perform one or more of the functions of the cloud manifest configuration management system 202. In some embodiments, components 204, 206, and 208, can comprise software instructions stored on memory 212 and executed by processor(s) 210. Cloud manifest configuration management system 202 may also interact with other hardware and/or software components not depicted in FIG. 2. For example, processor(s) 210 may interact with one or more external user interface devices, such as a keyboard, a mouse, a display monitor, a touchscreen, or other such interface devices.

Queue management component 204 can be configured to receive compressed data packets from one or more cloud agents residing at an industrial facility and organize the industrial data contained in the packets into priority queues that respectively define how the data packets are to be processed by cloud processing services. The worker role component 206 can be configured to determine how the data in the respective queues is to be processed based on manifests stored in a customer-specific manifest assembly. Manifest assembly component 208 can be configured to create, update, and manage manifests within customer-specific manifest assemblies on the cloud platform. The manifests define and implement customer-specific capabilities, applications, and preferences for processing collected data in the cloud, and can be uploaded by a user at the plant facility through a cloud agent.

The one or more processors 210 can perform one or more of the functions described herein with reference to the systems and/or methods disclosed. Memory 212 can be a computer-readable storage medium storing computer-executable instructions and/or information for performing the functions described herein with reference to the systems and/or methods disclosed.

Figure 3:
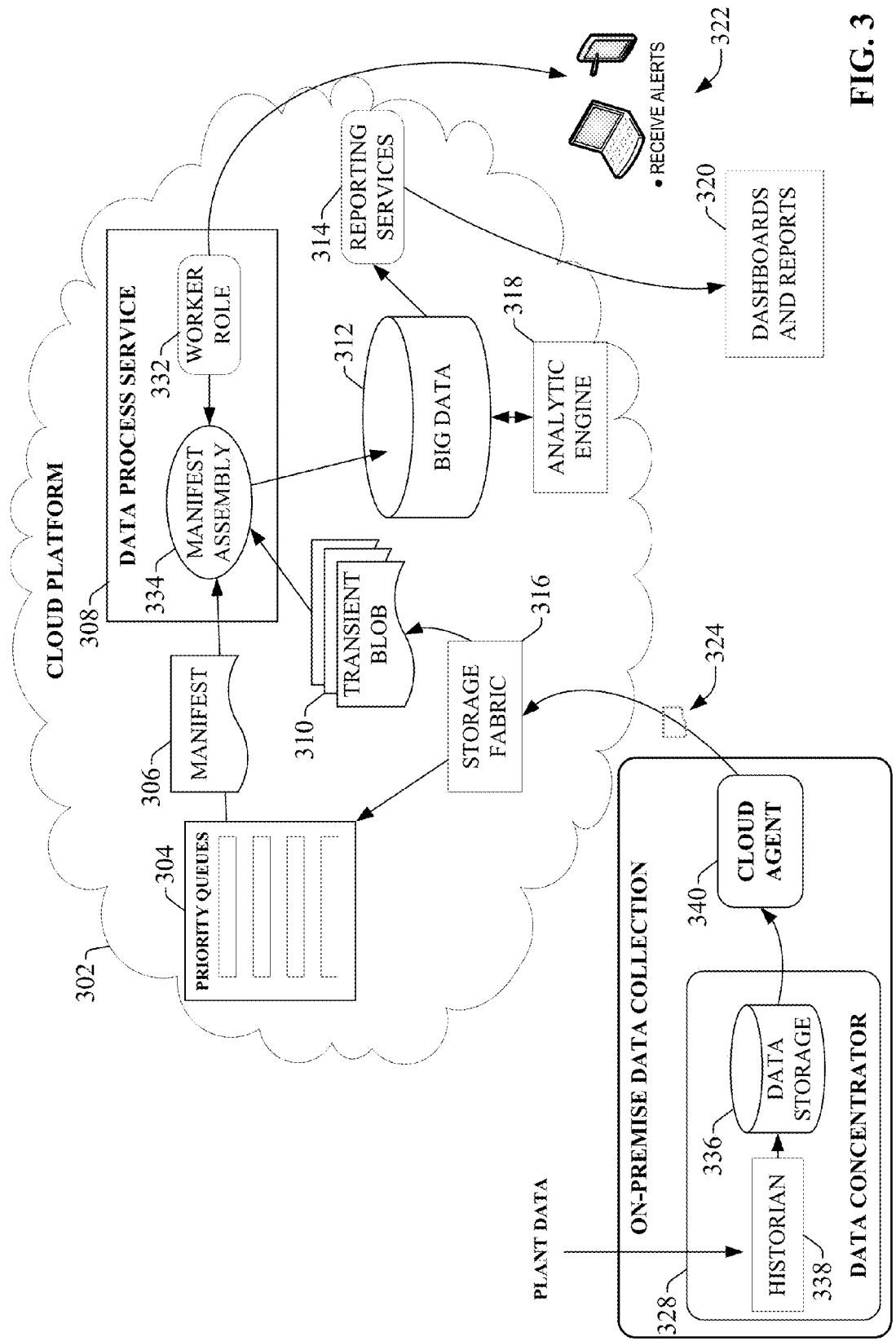
FIG. 3 is an overview of a system that leverages an agent-based cloud infrastructure to provide data collection and processing services to customer manufacturing sites.

FIG. 3 is an overview of a system that leverages an agent-based cloud infrastructure to provide data collection and processing services to customer manufacturing sites. This system can provide remote collection and monitoring services in connection with alarm and event notification for critical industrial assets, historical data collection, remote system access, system optimization, remote closed-loop control, and other such applications. The cloud-based infrastructure enables remote monitoring and reporting of on-premise assets by implementing six general areas of functionality—data ingestion into the cloud, data priority, object modeling, data processing, data analytics, and reporting.

In the example illustrated in FIG. 3 a data concentrator 328 collects plant data from one or more industrial assets (e.g., data generated by one or more industrial controllers, such as industrial devices 108 or 110) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, data concentrator 328 can monitor one or more controller tags defined in a tag archive and store data in local data storage 336 (e.g., a local structured query language, or SQL, server) associated with a historian 338. The collected data can include historical data (e.g., alarm history, status history, trend data, etc.), live data values read from the industrial assets, alarm data generated by the industrial assets, or other types of data.

An on-premise cloud agent 340 is configured to collect the live or historical data from the industrial assets, either directly or by accessing data storage 336 associated with data concentrator 228. Cloud agent 340 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to a cloud platform 302. Cloud agent 340 provides a software mechanism to dynamically link on-premise-to-cloud gateways. Cloud agent 340 provides an expandable data type schema that allows new data types to be added without the need to redeploy the monitoring system to the cloud.

During data collection, the cloud agent 340 can intelligently sort and organize the data based on defined criteria, including but not limited to time of occurrence and/or user-defined priorities. Cloud agent 340 can be, for example, a service (e.g., a Windows service) that periodically collects and transmits serialized and compressed data into the cloud domain using standard web services over HTTPS/SSL.

FIG. 3 depicts data concentrator 328 as the data source for cloud agent 340. This configuration can be useful if there are a large number of data points to monitor, since the data concentrator can 328 can link multiple industrial devices or other data sources to a single cloud agent 340. However, some embodiments of cloud agent 340 can collect data directly from the industrial assets themselves; e.g., through a common industrial protocol link, or through middleware applications such as OPC clients.

Figure 4:
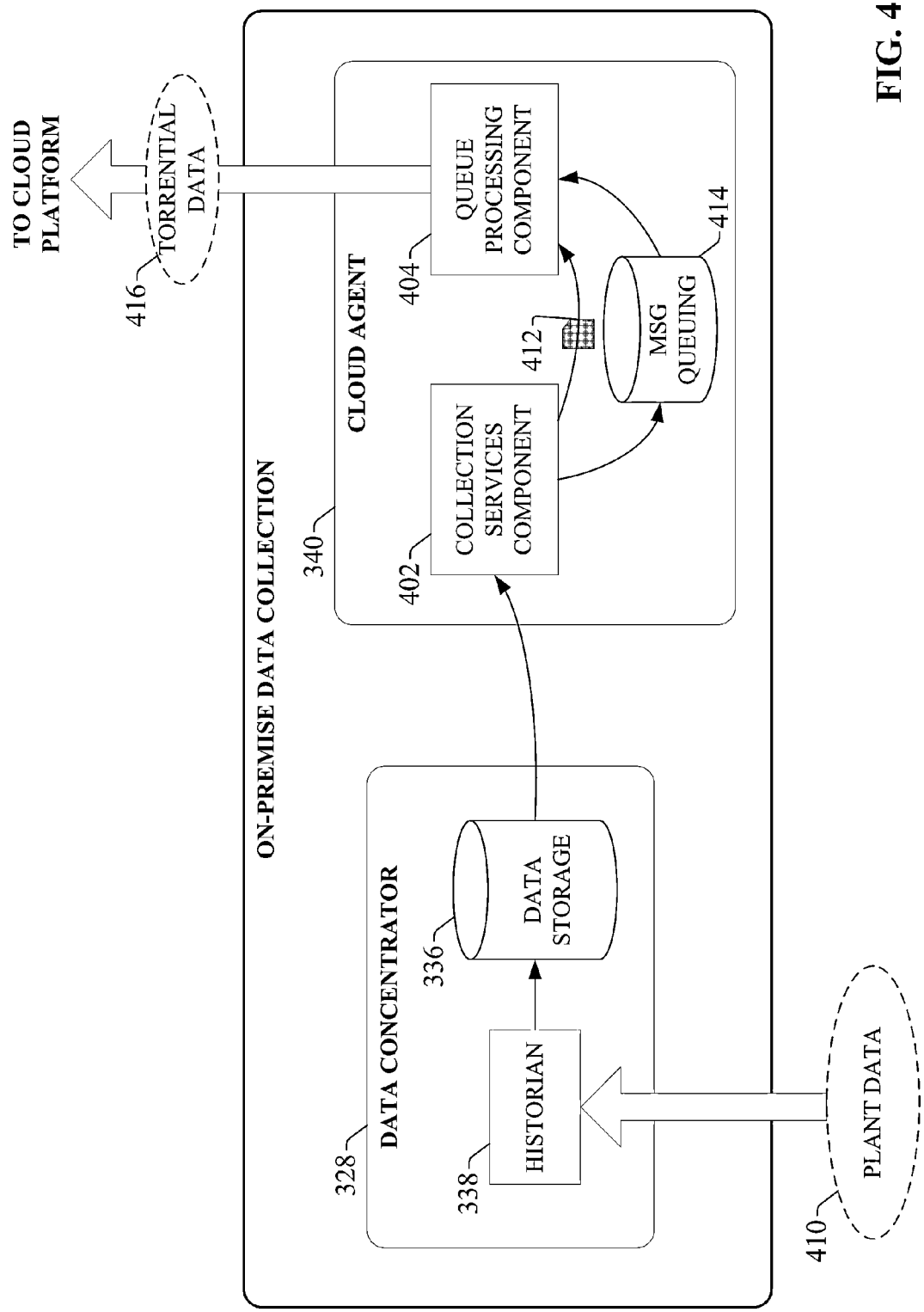
FIG. 4 is a block diagram illustrating on-premise data collection.

Cloud agent functionality is illustrated in more detail with reference to FIG. 4. On-premise data collection is enabled by a collection of services that function as a virtual support engineer for processing data. Data concentrator 328 and cloud agent 340 respectively implement two main functions associated with data collection—data concentration using a historian 338 and associated data storage 336 (e.g., an SQL server), and cloud data enablement using cloud agent services executed by cloud agent 340. As noted above, plant data 410 is collected by data concentrator 328 at the plant facility. In an example scenario, plant data 410 may comprise stamping press time series sensor data, made up of thousands of data points updated at a rate of less than a second.

Collection services component 402 of cloud agent 340 implements collection services that collect device data, either from data concentrator's associated data storage (e.g., via an SQL query) or directly from the devices themselves via a common industrial protocol (CIP) link or other suitable communication protocol. For example, to obtain data from data concentrator 328, collection services component 402 may periodically run a data extraction query (e.g., an SQL query) to extract data from data storage 336 associated with data concentrator 328. Collection services component 402 can then compress the data and store the data in a compressed data file 412. Queue processing services executed by queue processing component 404 can then read the compressed data file 412 and reference a message queuing database 414, which maintains and manage customer-specific data collection configuration information, as well as information relating to the customer's subscription to the cloud platform and associated cloud services. Based on configuration information in the message queuing database 414, queue processing component 404 packages the compressed data file 412 into a data packet and pushes the data packet to the cloud platform. In some embodiments, the cloud agent 340 can support injecting data packets as torrential data 416.

Message queuing database 414 can include site-specific information identifying the data items to be collected (e.g., data tag identifiers), user-defined processing priorities for the data tags, firewall settings that allow cloud agent 340 to communicate with the cloud platform through a plant firewall, and other such configuration information. Configuration information in message queuing database 414 instructs cloud agent 340 how to communicate with the identified data tags and with the remote data collection services on the cloud platform.

In addition to collection and migration of data, one or more embodiments of cloud agent 340 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 340 may be configured to compress the collected data using any suitable data compression algorithm prior to migrating the data to the cloud platform. This can include detection and deletion of redundant data bits, truncation of precision bits, or other suitable compression operations. In another example, cloud agent 340 may be configured to aggregate data by combining related data from multiple sources. For example, data from multiple sensors measuring related aspects of an automation system can be identified and aggregated into a single cloud upload packet by cloud agent 340. Cloud agent 340 may also encrypt sensitive data prior to upload to the cloud. In yet another example, cloud agent 340 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

In some embodiments, cloud agent 340 may also transform a specified subset of the industrial data from a first format to a second format in accordance with a requirement of a cloud-based analysis application. For example, a cloud-based reporting application may require measured values in ASCII format. Accordingly, cloud agent 340 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent 340 may also associate metadata with selected subsets of the data prior to migration to the cloud, thereby contextualizing the data within the industrial environment. For example, cloud agent 340 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 340 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent 340 can support HTTPS/SSL, certificate authority enabled transmission, and/or unique identity using MAC addresses. Cloud agent 340 can also support store-and-forward capability to ensure data is not lost if the agent becomes disconnected from the cloud.

Returning now to FIG. 3, cloud agent 340 sends compressed data packet 324 to the cloud-based data collection and monitoring system on cloud platform 302 via a cloud storage fabric 316. The data packet 324 conveys parameters and data (compressed and serialized) used by the cloud-side services to reconstruct the domain data structure in the cloud using auxiliary tenant-level manifests. The cloud services direct remote storage of the received data into preconditioned transient blobs 310. The cloud platform 302 can use agent reasoning and collective bargain features to determine a data storage locale.

Through the configuration interface provided by cloud agent 340, users at the plant facility can dynamically configure one or more priority queues 304 that respectively define how the data packets are processed in the cloud platform 302. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent 340 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent 340 can allow the user to define these priority queues 304 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through cloud agent 340, users can assign priorities to respective data tags or tag groups at the customer site. These priority assignments can be stored in the message queuing database 414 of the cloud agent 340. Accordingly, when queue processing component 404 packages the collected data to be moved to the cloud platform, the collected data items can be packaged into data packets according to priority (as defined in message queuing database 414), and the respective data packet headers populated with the appropriate priority level. If access to the cloud is unavailable, data will continue to be collected by collection services component 402 and stored locally on the cloud agent in local storage associated with collections services. When communication to the cloud is restored, the stored data will be forwarded to cloud storage. Queue processing services can also encrypt and send storage account keys to the cloud platform for user verification.

Figure 5:
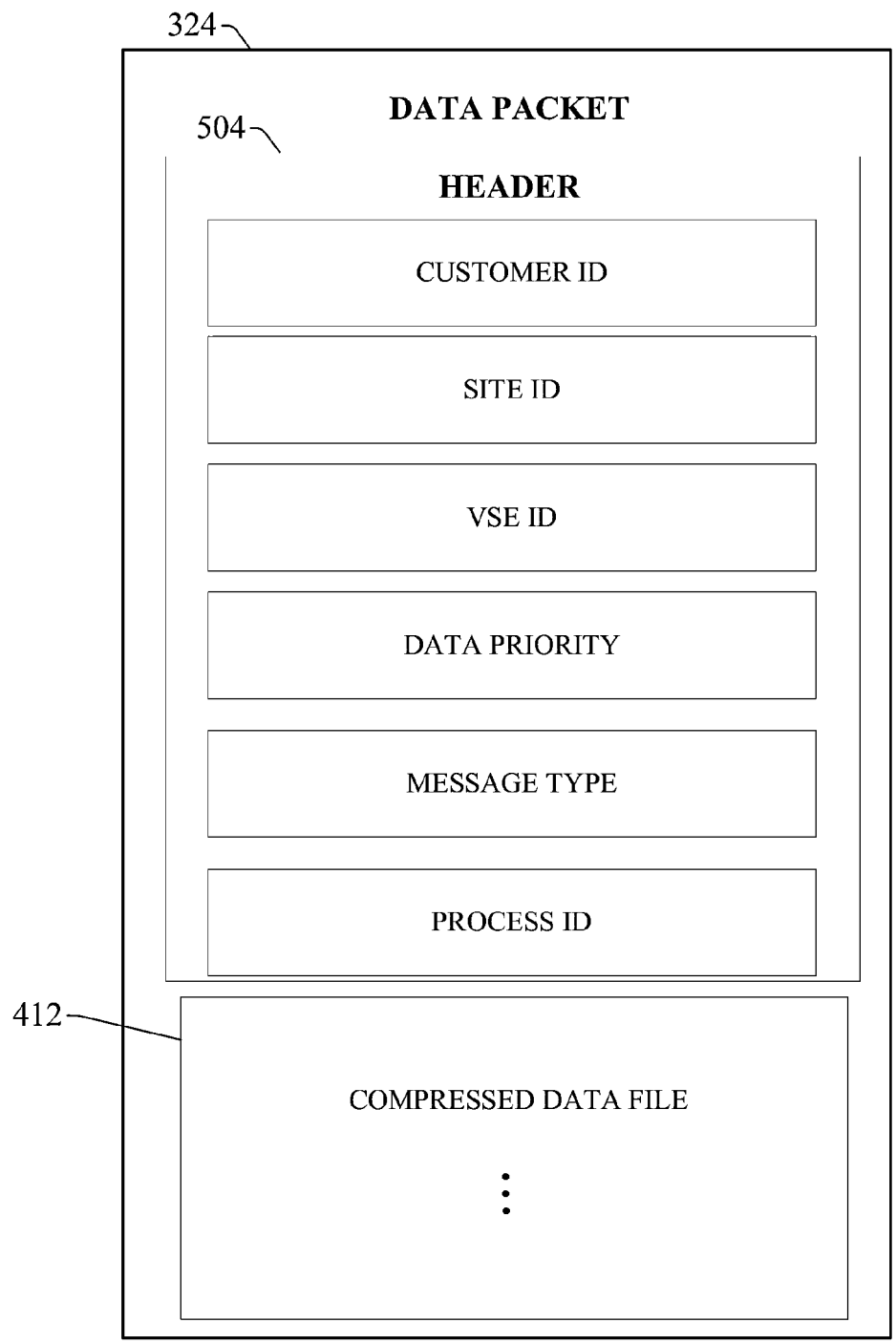
FIG. 5 is a diagram of an example compressed data packet.

Message queuing services implemented by queue processing component 404 of cloud agent 340 encapsulates or packages the compressed data file by adding customer-specific header information to yield a compressed data packed (e.g., compressed data packet 324 of FIG. 3). For example, the queue processing component 404 can access a message queuing database (e.g., message queuing database 414 of FIG. 4), which stores customer site configuration information and manages the customer's subscription to the cloud platform services. The message queuing database may include such information as a customer identifier associated with the customer entity associated with the industrial enterprise, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 5. As shown, the cloud agent's message queuing services add a header 504 to compressed data file 412 to yield the compressed data packet 324. The header 504 contains customer-specific data read from message queuing database 414. For example, header 504 can include a unique customer identifier, a site identifier representing a particular plant facility, a virtual support engineer identifier, a data priority for the data in the compressed data file 412, a message type, and a process identifier that specifies a particular manifest application on the cloud platform that should be used to process the data on the cloud side. Packaging the data in this way can allow data from diverse data sources to be packaged together using a uniform, generic data packaging schema so that the data can be moved to the cloud infrastructure When cloud agent 340 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 304 based on the priority. On the other side of the priority queues 304, a data process service 308 processes data in the respective priority queues 304 according to the predefined processing definitions. The data processing service includes a worker role 332 that determines how the queued data is to be processed based on manifests (e.g., system manifests, tag manifests, and metric manifests) stored in a customer-specific manifest assembly 334. Manifests define and implement customer-specific capabilities, applications, and preferences for processing collected data in the cloud. Manifests can be dynamically uploaded by a user at the plant facility through cloud agent 340, which facilitates dynamic extension of cloud computing capability.

For example, if new data points are to be added to the data collection system that require creation of a new data queue, the user can interact with cloud agent 340 to configure a new manifest for the new queue, the manifest defining such aspects as processing priority for the data, upload frequency for the data, where the data is to be routed or stored within cloud storage, and other such information. Cloud agent 340 can then upload the new manifest 306 together with the data (or independently of the data). The new manifest 306 is then added to the customer's manifest assembly 334 with the other manifests defined for the customer, so that worker role 332 can leverage the new manifest 306 to determine how data in the new queue is to be processed. This new manifest 306 need only be uploaded to the cloud-based remote monitoring service once. Thereafter, data placed in the new priority queue will be processed by worker role 332 according to the new manifest 306 stored in the customer's manifest assembly 334. For example, the manifest may define where the data is to be stored within cloud storage (e.g., in a historical database, and Alarms and Live Data database, big data storage 312, etc.), and whether processing of the new data queue is to take priority over other data queues. In some embodiments, the manifest assembly 334 may only accept a new manifest if the manifest is accompanied by a unique key associated with the client.

Once the cloud-based infrastructure has processed and stored the data provided by cloud agent 340 according to the techniques described above, the data can be made accessible to client devices 322 for viewing. Data analysis on the cloud platform 302 can provide a set of web-based and browser enabled technologies for retrieving, directing, and uncompressing the data from the cloud platform 302 to the client devices 322. To this end, reporting services 314 can deliver data in cloud storage (e.g., from the big data storage 312) to the client devices 322 in a defined format. For example, reporting services 314 can leverage collected data stored in the cloud repository to provide remote operator interfaces to client devices 322 over the Internet. An analytic engine 318 executing on the cloud platform 302 can also perform various types of analysis on the data stored in big data storage 312 and provide results to client devices 322.

Figure 6:
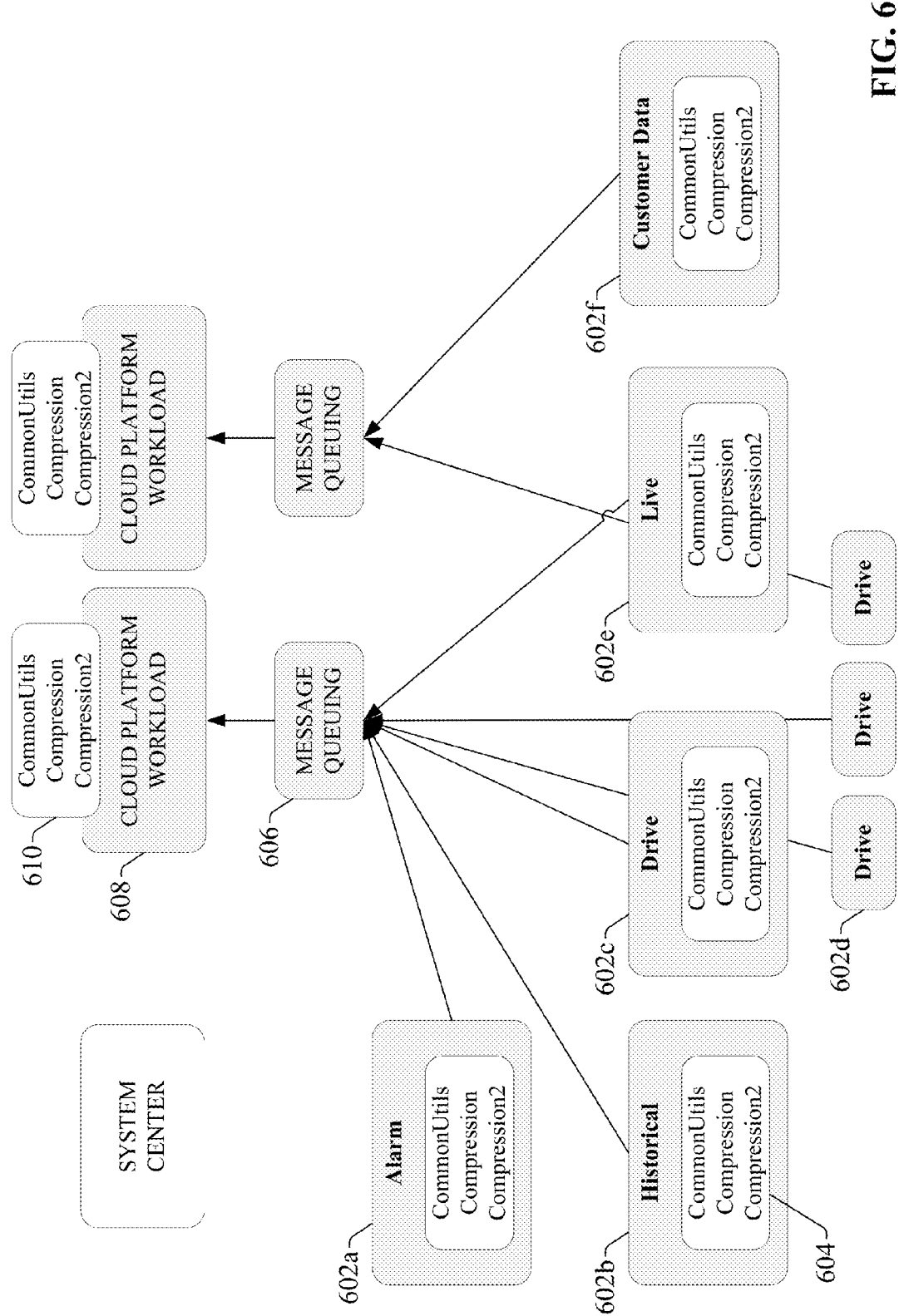
FIG. 6 is a block diagram illustrating an example agent architecture for collection of data from on-premise industrial devices.

FIG. 6 is a block diagram illustrating an example agent architecture for collection of data from on-premise industrial devices according to one or more embodiments. In this example, data is collected from a number of devices and applications 602 at the customer site, including an alarm database 602a, data historian 602b, motor drives 602c and 602d, live data server 602e, and a customer database 602f. Although these data sources comprise a diverse, heterogeneous collection of devices and applications, collection and pre-processing of data from these sources can be carried out by generic services 604 (e.g., service libraries). Generic services 604 can include utilities for identifying the data locations (e.g., devices, applications, tags, registers, etc.) from which data is to be retrieved, utilities for compressing or otherwise pre-processing the data, and providing the data to the message queuing layers 606 of the cloud agents. The workload services 608 of the cloud agents can also utilize generic services 610 to encapsulate and send the data to the cloud fabric. The message queuing layers 606 and workload services 608 make up the backbone of the decoupled agent architecture.

Figure 7:
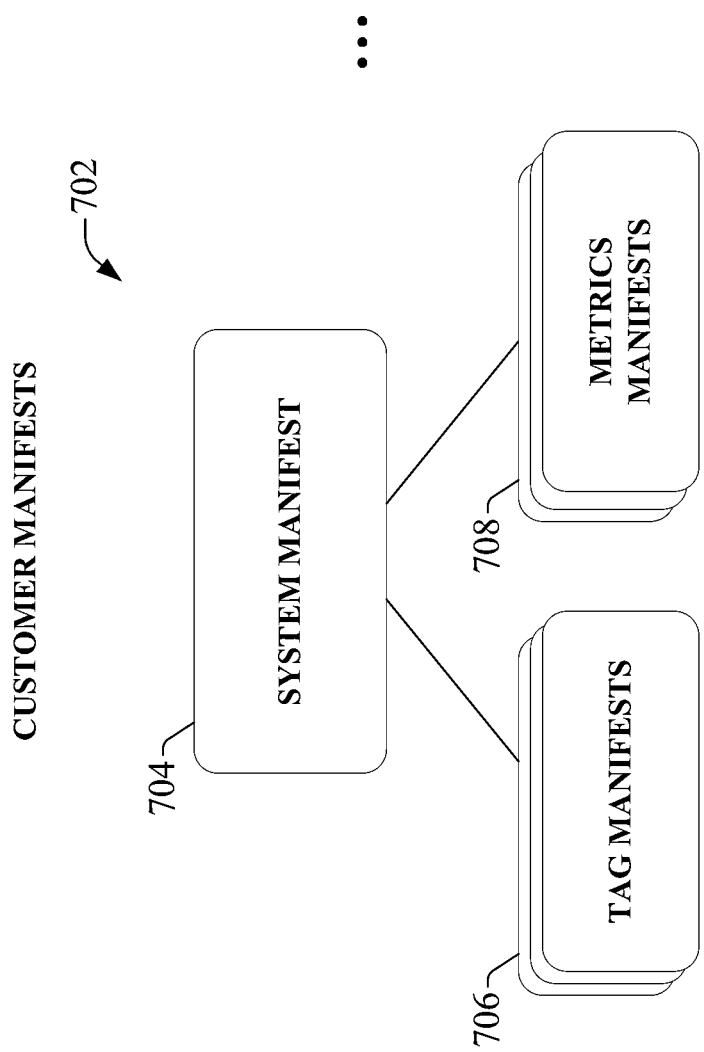
FIG. 7 is a conceptual diagram of an example manifest assembly.

Since the cloud agent 340 encapsulates the on-premise data collected from data collection applications into envelopes containing customer-specific and application-specific information, the compressed data packets convey the parameters and data required by the cloud to identify the appropriate manifest stored in the customer's manifest assembly (e.g., manifest assembly 334) for handling, processing, and/or routing of the data contained in the compressed data file. FIG. 7 is a conceptual diagram of an example manifest assembly 702. In this example, a system manifest 704 resides in the manifest assembly 334. System manifest 704 can correspond to a particular data collection device (e.g., an on-premise data collector including a cloud agent), and can include links to customer-specific and application-specific tag manifests 706 and metrics manifests 708 that define actions that can be performed on the data received from that data source. When a compressed data packet (e.g., compressed data packet 324 of FIG. 5) is received at the cloud platform from a cloud agent, data process service 308 uses information packaged in the header 504 of the packet to identify the appropriate manifest assembly (system manifest 704, tag manifest 706, and metrics manifest 708) for processing the data contained in the compressed data file 412. A worker role (e.g., worker role 332 of FIG. 3) fetches and loads the identified manifest assembly, which is then executed on the received data. In general, the metrics manifest 708 identifies one or more generic procedures that can be retrieved and executed on the data, as well as application-specific ranges, coefficients, and thresholds that may be passed to the retrieved procedures as parameters. The tag manifest 706 identifies tag names used to map the data items in the compressed data file to variables or tags defined in the retrieved generic procedures.

Figure 8:
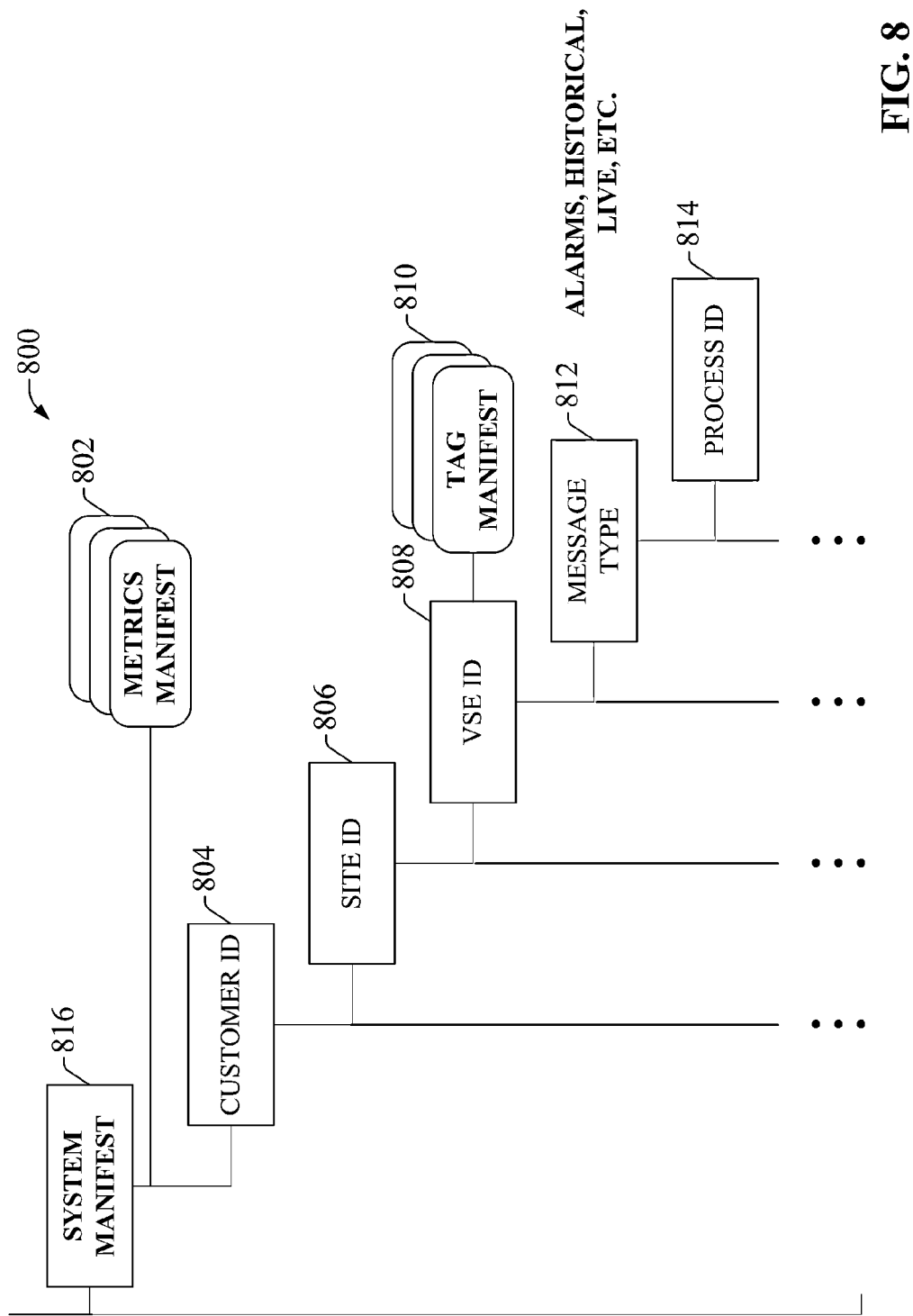
FIG. 8 is an example hierarchical architecture for a manifest assembly.

FIG. 8 illustrates an example hierarchical architecture 800 for the manifest assembly according to one or more embodiments. An example system manifest 816 maintained on the cloud platform in a manifest repository can be organized into multiple hierarchical levels. Each individual customer entity that will access the manifest repository for processing of on-premise data can be defined under a customer identifier level 804. Since each customer entity may operate multiple plant facilities or sites, one or more site identifier nodes are defined for each customer identifier node on a site identifier level 806. For each defined site, one or more virtual support engineer (VSE) nodes are defined on a VSE identifier level 808. A message type level 812 and a process identifier level 814 are defined under the VSE identifier level 808.

Note that the hierarchical levels of the example manifest depicted in FIG. 8 correspond to data fields included in header 504 of compressed data packet 324 (see FIG. 5). Thus, when an on-premise cloud agent sends a compressed data packet to the cloud platform, data process service 308 on the cloud platform leverages the information contained in the header to navigate the manifest's hierarchical architecture 800 to identify the manifest assembly (system manifest, metrics manifest, and tag manifest) to be executed on the data contained in compressed data file 412.

Figure 9:
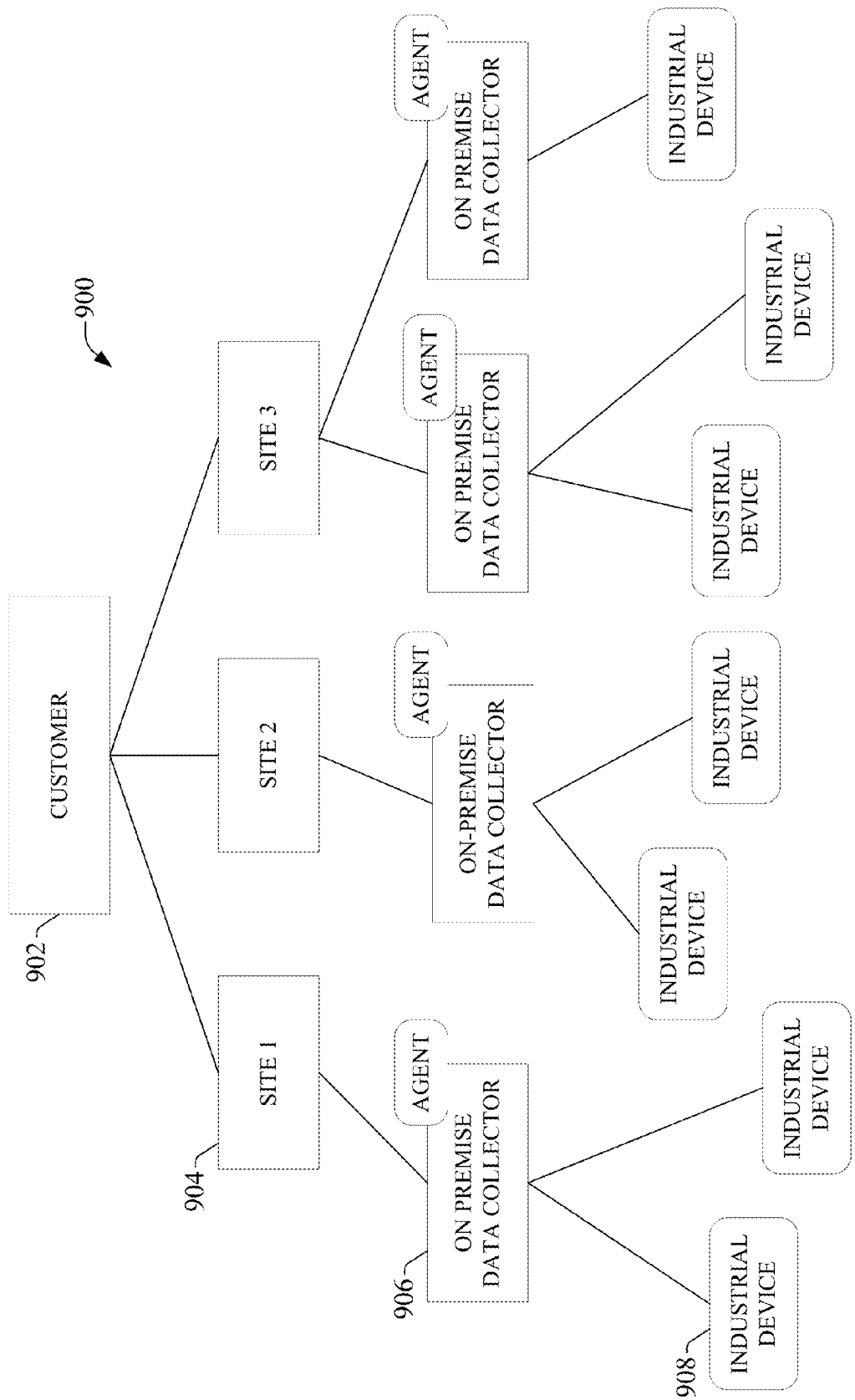
FIG. 9 is a block diagram of an example customer hierarchy.

The hierarchical levels that make up the logical architecture of the manifest assembly describe a hierarchical relationship between sets of on-premise industrial data collected from various data sources across an industrial enterprise. Turning briefly to FIG. 9, a block diagram of an example customer hierarchy 900 is illustrated. In this example, a customer 902 operates three geographically diverse facilities or sites 904. A number of on-premise data collectors 906 (e.g., devices executing cloud agents that collect data from one or more data sources, as illustrated in FIGS. 3 and 4) are deployed at the various customer sites 904 and collect data from one or more industrial devices 908 or other data sources at the plant facility.

Customer hierarchy 900 is used by the cloud architecture to model and organize customer site information. As described above, cloud agents associated with the on-premise data collectors 906 compress data collected from the industrial devices 908 to yield a compressed data file, and package the compressed data file with header information, as illustrated in FIG. 5. The customer ID, site ID, and VSE ID fields of header 504 correspond to the customer, site, and on-premise data collector levels, respectively, of customer hierarchy 900. When the cloud agent sends the resulting compressed data packet to the cloud platform, the worker role 332 executing on the cloud platform identifies and invokes a particular system manifest within a manifest repository based on the customer ID, site ID, and VSE ID values in the header. The worker role 332 then determines the particular metrics manifest and tag manifest associated with the system-level manifest to be used to process the data received in the packet.

Returning to FIG. 8, the metrics manifest 802 defines one or more metrics or actions (identified by the process identifier field of the compressed data packet header 504) that can be carried out on the data. The metrics manifest 802 also defines the coefficients, thresholds, and ranges to be used for each identified metric. Each metric (process) corresponds to a generic procedure stored on the cloud platform in association with the manifest assembly 334. As will be described in more detail below, the metrics manifest 802 defines which of the available generic procedures are to be used to process the data received in the packet.

Worker role 332 uses the customer identifier, site identifier, and VSE identifier fields of header 504 to navigate the corresponding levels of the system manifest and select a particular tag manifest 810 for processing of the data. The tag manifest 810 defines tag names used to map data items in the compressed data file 412 (or in customer data storage) to the one or more metrics (processes) that will operate on the data, as defined by the metrics manifest. The tag manifest 810 also identifies which process identifiers have ownership over each tag name. The particular process that will be executed on the data is identified by the message type and process identifier fields of the header 504. In this regard, the system manifest may define multiple message types (e.g., alarms, historical data, live data, etc.), and, for each defined message type, define one or more namespaces corresponding to a given process identifier. The namespaces identify corresponding applications stored in association with the manifest assembly that can be loaded by worker role 332 and executed on the data contained in the encapsulated data file. These applications may specify a final destination for the data (e.g., big data storage on the cloud, one or more specified client devices, a visualization application, etc.), or may comprise algorithms or computational procedures to be carried out on the data to yield a desired result (e.g., a net power calculation, an efficiency calculation, a power guarantee calculation, etc.).

By this architecture, the worker role in the cloud platform will load the appropriate manifest assembly for processing a received data packet based on the customer from which the data was received, as well as other data attributes—such as the customer facility or site, a device from which the data was received, the type of data (e.g., alarm data, historian data, live data from industrial devices, etc.), a specified process or metric, etc.—identified by the header of the compressed data packet. By encapsulating collected data on the plant floor to include these attributes prior to sending the data to the cloud, the cloud agent effectively applies a customer-specific model to the data that describes the data's context within the plant hierarchy, as well as the data's relationship to other data items across the enterprise. This information can then be leveraged on the cloud side to appropriately handle and process the data based on the data's role in the larger enterprise as well as user-defined processing and storage preferences.

FIG. 10 illustrates an example system manifest 1000. As shown, the system manifest 1000 conforms to a hierarchical structure wherein levels of the hierarchy can be navigated based on data provided in the data packet header 504. The system manifest can include links to one or more available tag manifests and metrics manifests that can be selectively invoked to process data received from the cloud agents on the plant floor. The system manifest includes hierarchical levels for customer ID 1002, site ID 1004, and VSE ID 1006. Multiple customers, sites, and VSEs can be defined within each of the respective levels, and a particular tag manifest and metrics manifest can be associated with a given customer, site, and VSE. As shown in the example system manifest 1000, a particular metrics manifest 1008 and tag manifest 1010 is associated with a customer ID 1002, site ID 1004, and VSE ID 1006. Additional hierarchical levels for message type 1012 and process ID 1014 are used by the worker role to identify the respective namespaces 1016 and associated assembly files that define how the data is to be processed by the cloud-based data process services. In the example illustrated in FIG. 10, Alarm data is associated with the namespace CoreProcessAssembly.AlarmDataProcess (assembly file name CoreProcessAssembly.dll), while Historical data is associated with the namespace CoreProcessAssembly.HistoricalDataProcess.

FIG. 11 illustrates an example tag manifest 1100, which identifies the data to be operated on by the identified metrics. The data is identified using tag names 1102 that specify the data to be extracted from one or both of the compressed data packet or cloud-based customer storage. The tag manifest 1100 also defines one or more application IDs 1108 representing applications that can be invoked and executed on the data. The application IDs 1108 are respectively defined in terms of one or more process IDs 1104 corresponding to stored generic procedures that will be executed on the data when the corresponding application ID is invoked. In the example tag manifest illustrated in FIG. 11, application ID 1.1 (named "TurboExpander1") comprises three processes—process ID 1 ("NetPower"), process ID 2 ("CycleEfficiency"), and process ID 3 ("PowerGuarantee"). These processes—which correspond to universal, generic procedure code stored on the cloud platform—will be applied to the data corresponding to the tag names 1102 when the TurboExpander1 application is invoked.

Controller IDs 1106 representing controllers from which some or all of the data was retrieved are also defined in the tag manifest 1100. In this example, each tag name definition also specifies which of the process IDs 1104 and controller ID 1106 own the data corresponding to the tag.

Figure 12:
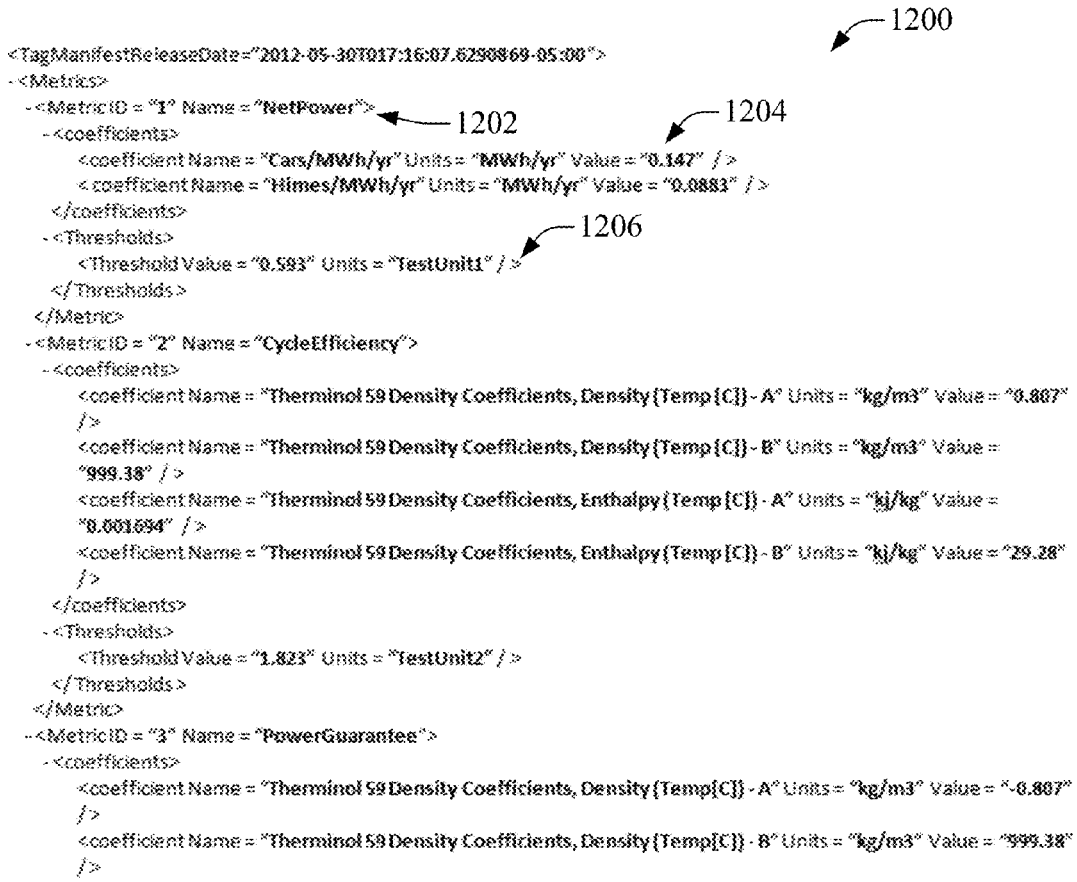
FIG. 12 is a portion of an example metrics manifest.

FIG. 12 illustrates an example metrics manifest 1200, which defines the coefficients, thresholds, and ranges to be used for each of the processes (metrics) specified in by the process IDs 1104 in the tag manifest 1100. For each metric ID 1202 (corresponding to the process IDs defined in the tag manifest 1100), a set of coefficients 1204 and thresholds 1206 are defined. For each defined coefficient, the metrics manifest 1200 defines a coefficient name, a unit, and a value. For each defined threshold, the metrics manifest 1200 defines a value and a unit.

Figure 13:
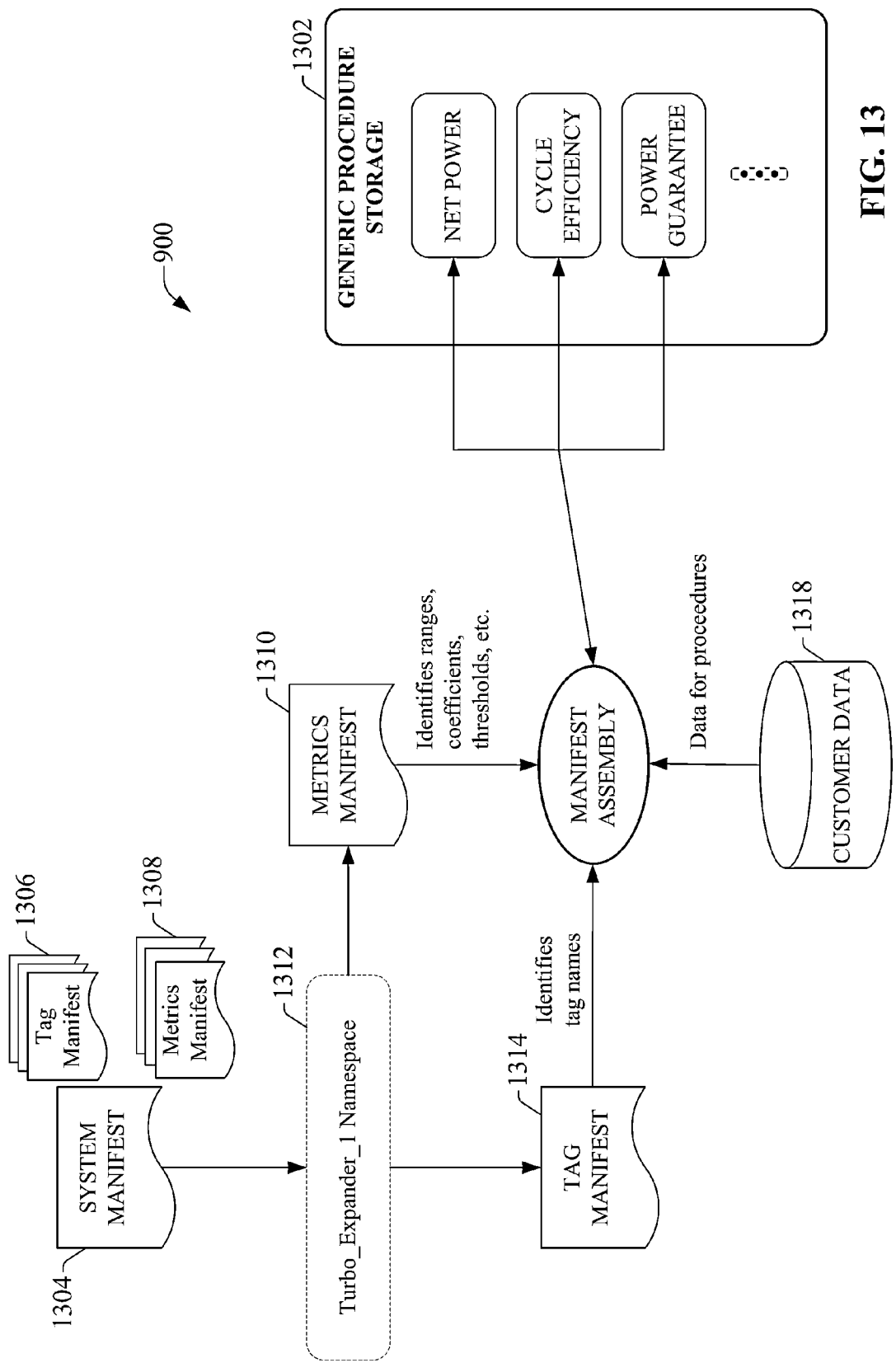
FIG. 13 is a block diagram illustrating retrieval and application of generic procedures by cloud-based data process services based on customer-specific and application-specific manifest assemblies.

As noted above, each metric (process) defined in the manifest assembly corresponds to a generic procedure stored in generic procedure storage on the cloud platform. FIG. 13 is a block diagram illustrating retrieval and application of generic procedures by the cloud-based data process services based on customer-specific and application-specific manifest assemblies. As described above, when a compressed data packet is received at the cloud platform, the header data appended to the data file is read by a worker role and used to identify a particular system manifest 1304. System manifest 1304 has links to application-specific tag manifests 1306 and metrics manifests 1308. The header information in the compressed data packet informs the worker role which particular tag manifest 1314 and metrics manifest 1310 are to be invoked to process the data contained in the compressed data file of the packet. The tag manifest 1314 identifies the tag names corresponding to the data items to be extracted from customer-specific cloud storage 1318 for processing, where the data maintained in cloud storage 1318 is provided by the compressed data packets received by the on-premise cloud agents. The metrics manifest 1310 identifies the ranges, coefficients, and thresholds that are to be used as parameters for execution of the procedures on the identified data tags. In this example, the selected metrics manifest 1310 and tag manifest 1314 are associated with the Turbo_Expander_1 namespace 1312, which is selected by the worker role based on one or more fields in the data packet header 504. For example, the customer ID, site ID, and VSE ID fields of the header may be used to identify the system manifest 1304 and the associated metrics manifest 1310 and tag manifest 1314 1304 to be invoked. The particular application defined by the tag manifest 1314 to be applied to the data may be specified by the message type and process ID fields of the header 504.

The Turbo_Expander_1 namespace 1312 (corresponding to the TurboExpander1 application ID define in the tag manifest 1100) comprises three processes—NetPower, CycleEfficiency, and PowerGuarantee. These processes correspond to generic procedures maintained in generic procedure storage 1302. Generic procedure storage 1302 stores universal, generic procedures or code that can be fetched by the worker role as needed based on the particular process specified by the identified manifest assembly. The worker role examines tag manifest 1314 to determine the processes corresponding to the Turbo_expander_1 namespace 1312, and retrieves the corresponding generic procedures from generic procedure storage 1302. The tag manifest 1314 also defines the tag names corresponding to the customer data stored in customer-specific cloud storage 1318 to which the retrieved procedures are to be applied. Accordingly, this data is extracted from cloud storage 1318. The retrieved procedures are then executed on the retrieved customer data, using the ranges, coefficients, and thresholds defined by the metrics manifest 1310 as operational parameters.

Substantially any type of procedure can be defined in generic procedure storage 1302 and applied to the data tags. For example, the net power, cycle efficiency, and power guarantee procedures can be configured to derive calculated values (e.g., net power values, efficiency values, etc.) by applying algorithms to the data corresponding to the identified data tags. Other types of procedures may instruct that the data be sent to a particular destination (e.g., a client device, a permanent cloud storage location, big data storage, etc.), or that the data be sent to a different remote cloud platform. Other types of generic operations (e.g., interpolation) can also be defined using generic procedures that can be stored in generic procedure storage 1302 and invoked by manifest assemblies as needed. In general, the generic procedures in generic procedure storage 1302 yield a pre-built library of generic functions that can reused across tenants.

Figure 14:
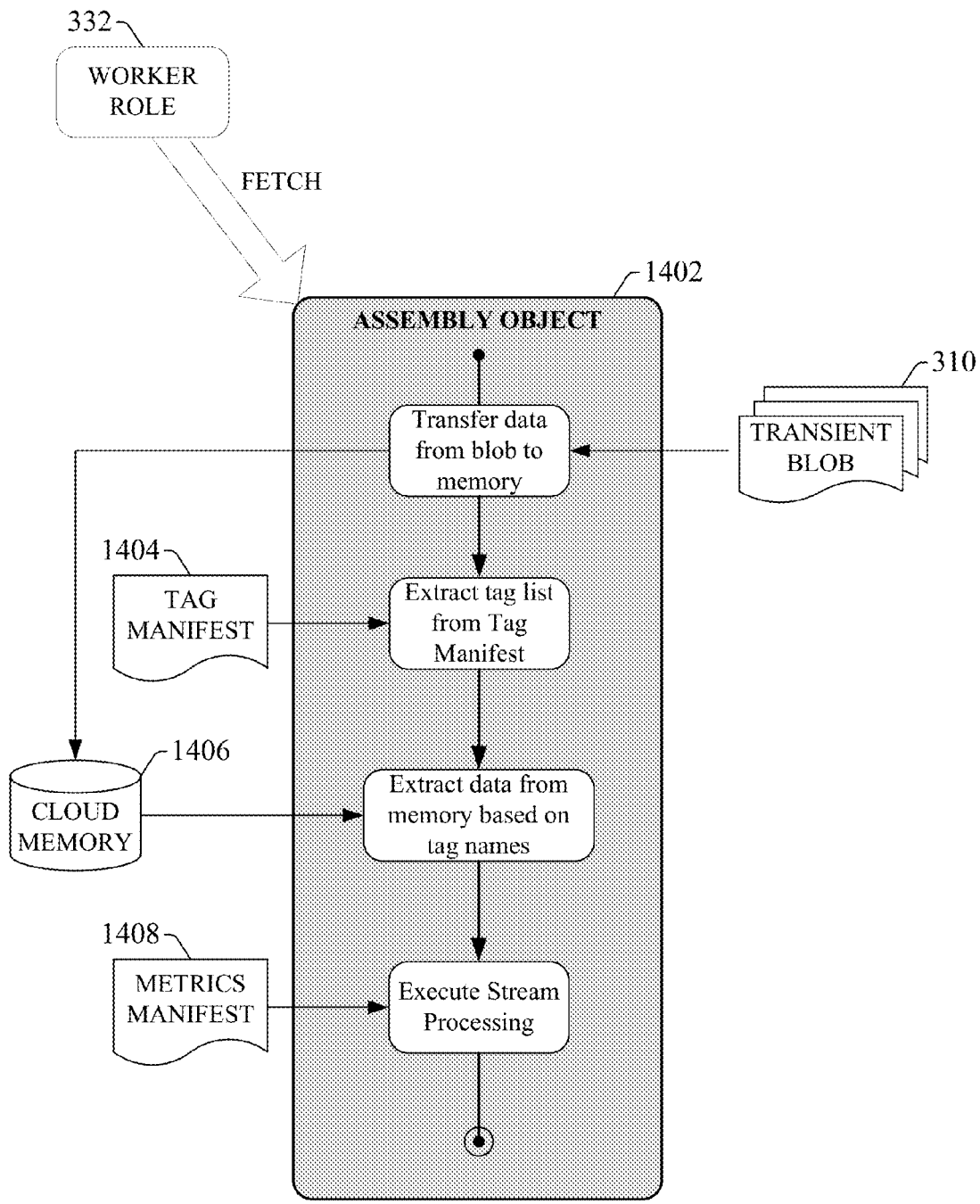
FIG. 14 is a flowchart illustrating the use of a manifest assembly to execute near real-time stream processing in the cloud platform.
Figure 15:
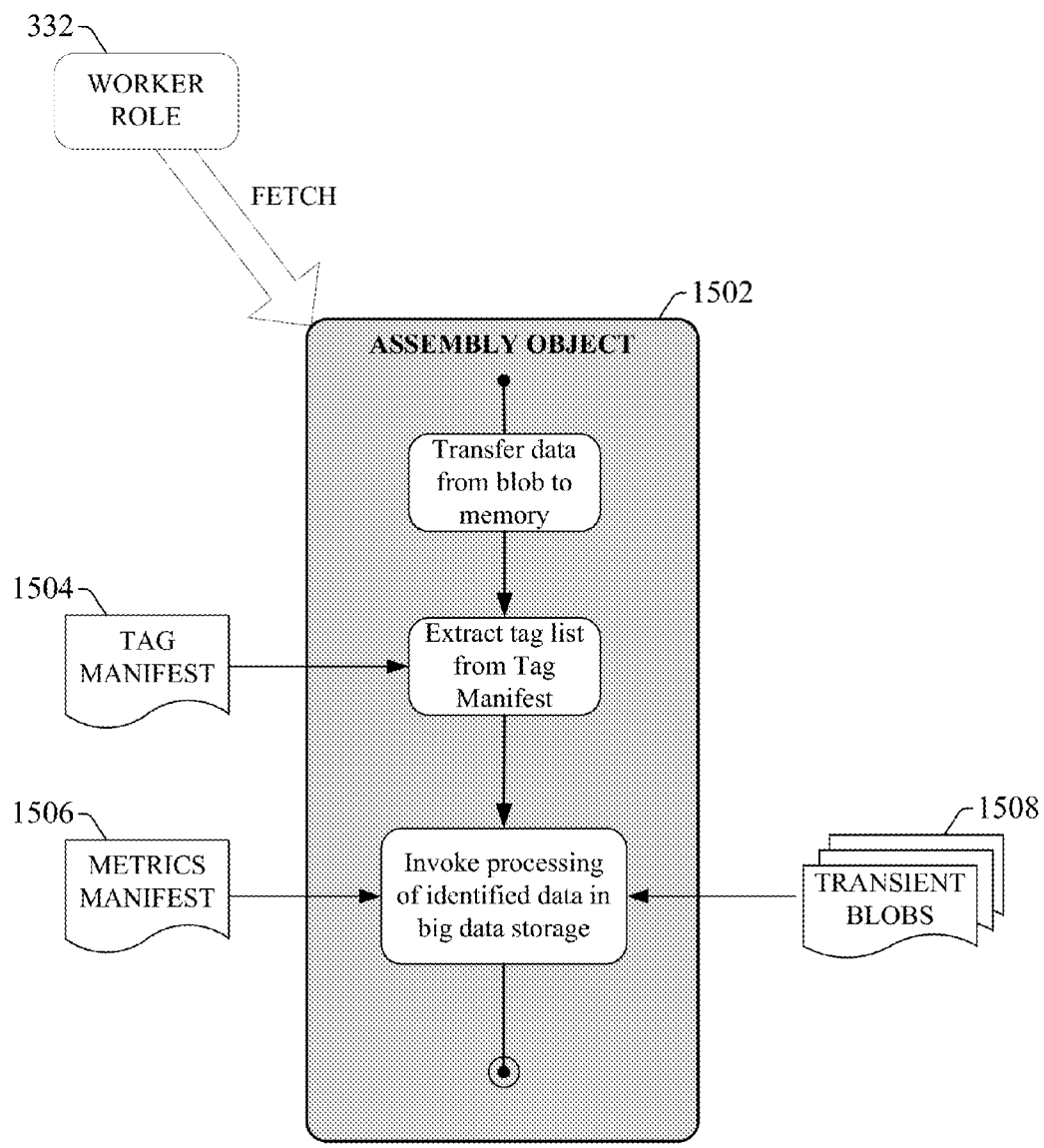
FIG. 15 is a flowchart illustrating the use of a manifest assembly to execute big data processing in the cloud platform.
Figure 16:
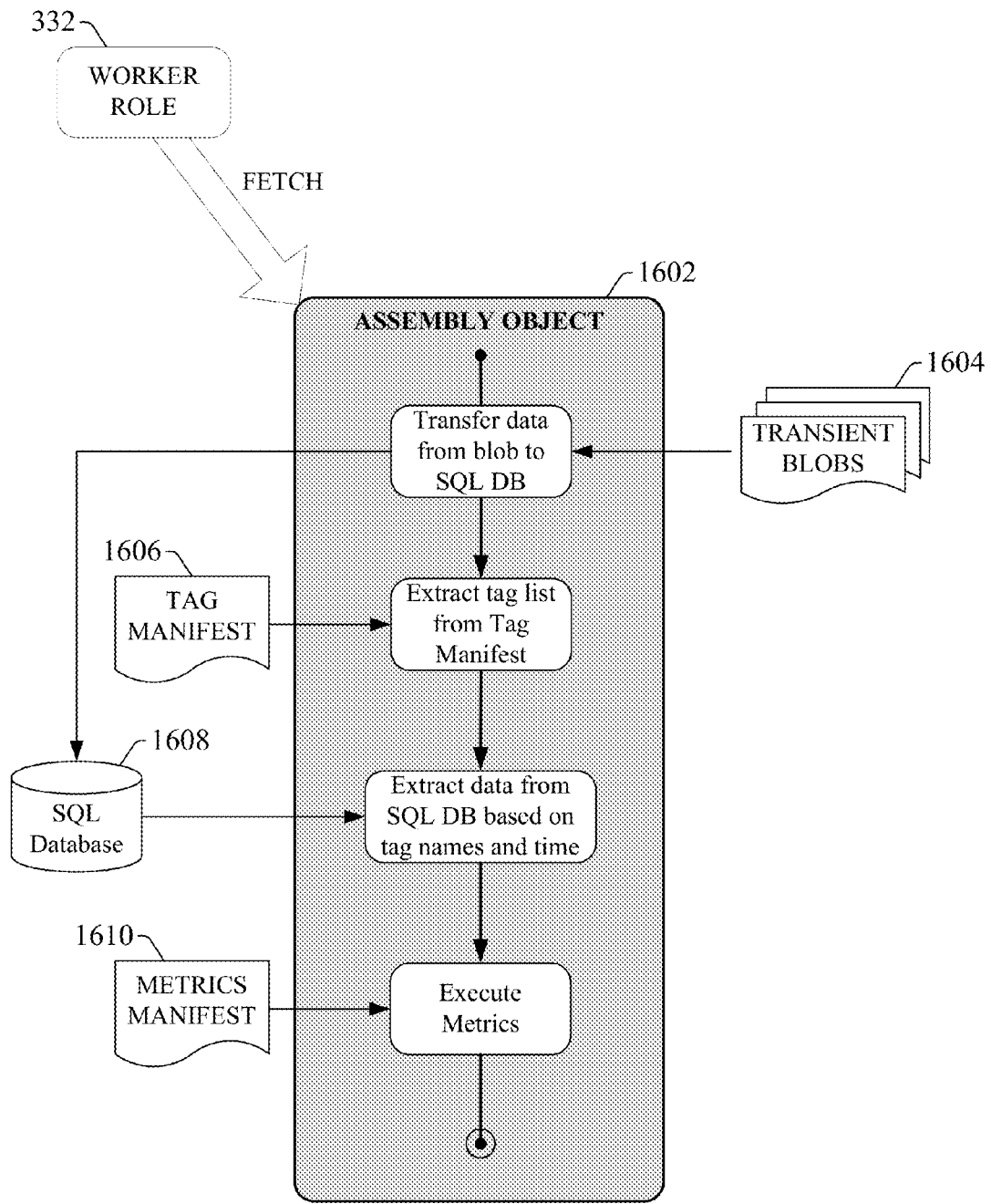
FIG. 16 is a flowchart illustrating the use of a manifest assembly to execute analytics based on structured data.

The process described above in connection with FIG. 13 can be implemented in a number of different ways. FIGS. 14-16 are flowcharts illustrating three different example implementations for performing data processing in the cloud platform in accordance with a given manifest assembly. FIG. 14 is a flowchart illustrating the use of a manifest assembly to execute near real-time stream processing in the cloud platform. In this example, when a compressed data packet is received at the cloud platform from a cloud agent, worker role 332 fetches an assembly object 1402 corresponding to the manifest assembly identified by the data packet's header. The data file contained in the compressed data packet is extracted and transformed into one or more transient blobs 310 by the cloud processing services. The assembly object 1402 transfers data from the transient blobs 310 to cloud memory 1406. Next, the assembly object 1402 extracts the tag list from the tag manifest 1404 identified by the header. The data identified by the tag list is then extracted from cloud memory 1406, and stream processing is executed on the extracted data in accordance with the parameters (ranges, thresholds, etc.) defined in the metrics manifest 1408. The process depicted in FIG. 14 facilitates near real-time processing of plant floor data as it is received at the cloud platform.

FIG. 15 is a flowchart illustrating the use of a manifest assembly to execute big data processing in the cloud platform. In this example, worker role 332 fetches assembly object 1502 in response to receipt of a data packet, and the worker role 332 transfers data from a transient blob to cloud memory. The assembly object 1502 reads a tag list from tag manifest 1504, which may identify data items stored in big data storage 312 (see FIG. 3). The assembly object 1502 then invokes processing of the identified data in big data storage based on parameters read from metrics manifest 1506. The processing may comprise parallel processing of the data stored in big data storage as well as data extracted from transient blobs 1508.

FIG. 16 is a flowchart illustrating the use of a manifest assembly to execute analytics based on structured data. As in the previous examples, worker role 332 fetches an assembly object 1602 corresponding to a manifest assembly identified by a received data packet. Data from one or more transient blobs 1604 representing the data file extracted from the data packet is transferred from the blobs to a SQL database 1608 or other type of relational database. The assembly object 1602 then extracts a tag list from tag manifest 1606 identifying the tag names on which metrics are to be executed. The data identified by the tag names are then extracted from the SQL database 1608, together with time stamp information associated with the data. Metrics are then executed on the extracted data based on parameters defined by the metric manifest 1610. The implementation depicted in FIG. 16 facilitates time-series processing of data stored in SQL database 1608.

It is to be appreciated that embodiments described herein are not limited to the processing types depicted in FIGS. 14-16. Moreover, in some embodiments the same cloud application can include a combination of different types of processing implementations. For example, the same cloud application could support any combination of real-time processing, big data processing, continuous cycle processing, user-triggered processing (e.g., processing triggered by user input entered via a remote dashboard or other type of interface), etc.

Figure 17:
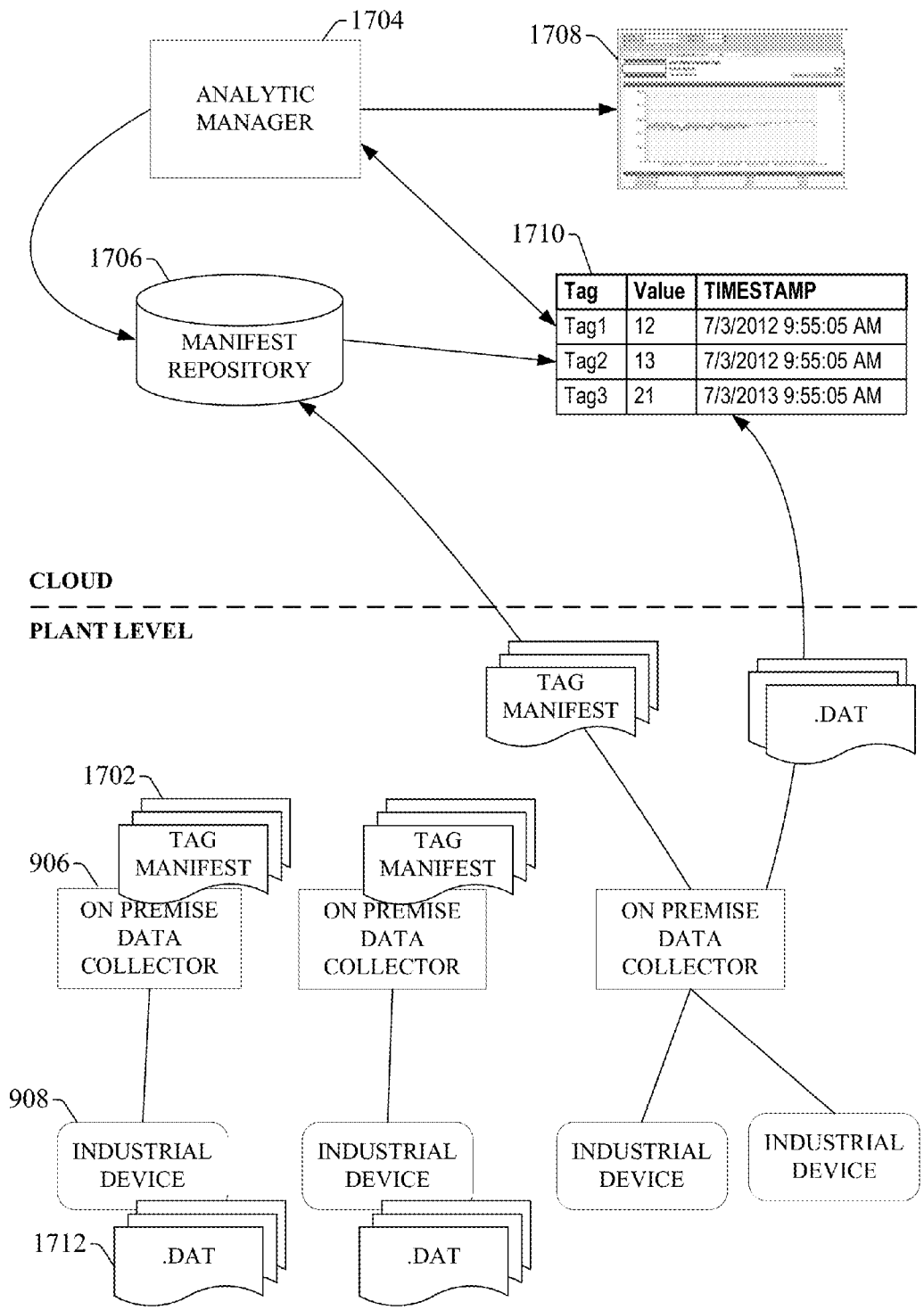
FIG. 17 is a block diagram illustrating delivery of tag manifest data to the cloud platform.

Services associated with the on-premise data collectors allow users to remotely update all or portions of their manifests from the industrial facility. For example, when new devices are added to a customer's industrial system, the tag manifests associated with the customer must be updated to reflect the new data tags available in the devices, allowing the cloud services to accommodate the new data. FIG. 17 illustrates delivery of tag manifest data to the cloud platform according to one or more embodiments. In this example, on-premise data collectors 906 collect data from industrial devices 908 (e.g., in the form of .dat files). The on-premise data collectors 906 also maintain tag manifest data 1702 identifying the data tags available in the respective devices 908. The tag manifest data 1702 can also define how the data collected from their associated devices is to be processed. Users may define the type of processing to be performed on the data by either identifying an existing priority queue in the cloud platform to which the data is to be sent, or by defining a new priority queue for processing of the data. The tag manifest data 1702 may also describe hierarchical relationships between the data based at least in part on a hierarchical object model definition. The on-premise data collectors 906 send the tag manifest data 1702 to the manifest repository 1706 on the cloud platform. Data processing services executing on the cloud platform will only update the portions of the customer's manifest required to implement the change. For example, if the new data tags are to be processed using an existing priority queue, the cloud platform services may only update the portion of the manifest required to add the new data tags to the specified queue. If a new priority queue is defined in the uploaded tag manifest data 1702, the cloud platform services will update the appropriate portions of the customer's manifest to create the new queue and associate the new data tags with the queue.

The tag manifest data 1702 facilitates generation of a customer-specific object model in the cloud platform, which can be used to simplify data processing at the cloud level, and to facilitate suitable processing and meaningful reporting of the data. The tag manifest may define a hierarchical structure of the customer's enterprise from the plant level down to the tag level. For example, as illustrated in FIG. 11, the tag manifest may include information defining control system identifiers, controller identifiers, network identifiers, application identifiers, functional descriptions of the customer's various industrial assets, tag names, and hierarchical relationships between these various entities. An analytics manager 1704 can leverage the manifest data maintained in the manifest repository 1706 to generate trend displays 1708 for the collected data, or to render time-stamped data 1710 organized according to plant, line, workcell, machine, or any other suitable organization criterion.

FIGS. 18-21 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 18:
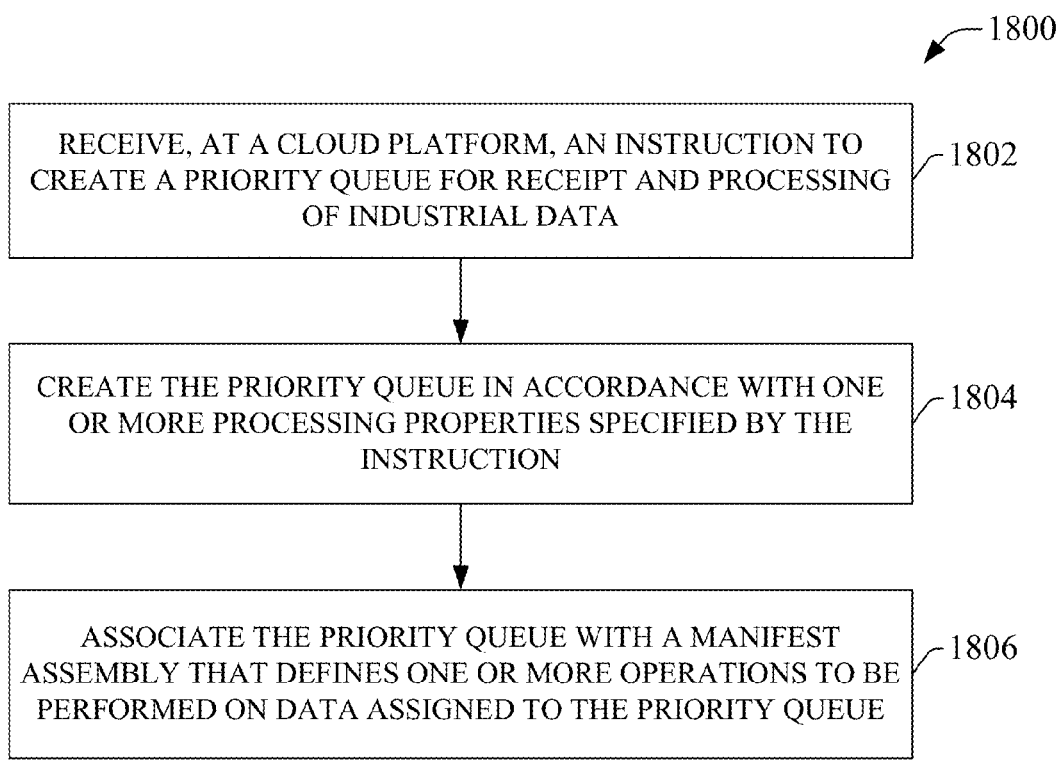
FIG. 18 is a flowchart of an example methodology for creating priority queues and associated manifest assemblies in a cloud platform for cloud-side processing of industrial data.

FIG. 18 illustrates an example methodology 1800 for creating priority queues and associated manifest assemblies in a cloud platform for cloud-side processing of industrial data. Initially, at 1802, an instruction is received at a cloud platform to create a priority queue for receipt and processing of industrial data. The instruction can be received, for example, from a cloud agent residing in an industrial facility, via a configuration dashboard or other type of user interface that allows a system administrator to configure priority queues for processing of respective different types of industrial data, or from other priority queue configuration means.

At 1804, the priority queue is created in the cloud platform in accordance with one or more processing properties specified by the instruction. The priority queue can be one of multiple priority queues defined for a specific customer entity in the cloud platform, where the priority queues define how data packets received from on-premise data collection systems residing at a customer facility are to be processed by cloud processing services executing in the cloud platform. Each priority queue can be associated with a different data type (e.g., live data, historical data, alarm data, etc.) or customer-specific application. For example, the instruction may define a data type to be assigned to the priority queue; an upload frequency associated with the priority queue; a priority level of the priority queue relative to other defined queues; an identity of a cloud partition, remote cloud, or database to which data in the queue is to be sent for storage; or other such information.

At 1806, the priority queue is associated with a manifest assembly that defines one or more operations to be performed on data assigned to the priority queue. The manifest assembly can reside in a manifest repository on the cloud platform, and defines one or more procedures to be executed on industrial data assigned to the queue (e.g., placement of the data in a particular storage location, calculation of one or more metrics based on the data, rendering of a data at a remote device, generation of a remote notification when the data satisfies a criterion, etc.). The manifest assembly can also identify ranges and thresholds to be used as parameters for the specified procedures, and data tags for mapping data assigned to the priority queue to corresponding variables of the procedures. Once the priority queue has been established, data packets received from on-premise data collection components at a plant facility can be placed in the priority queue based on a determination of that the data packet corresponds to the data type defined for the priority queue, and the data packet can be processed in accordance with the associated manifest assembly.

Figure 19:
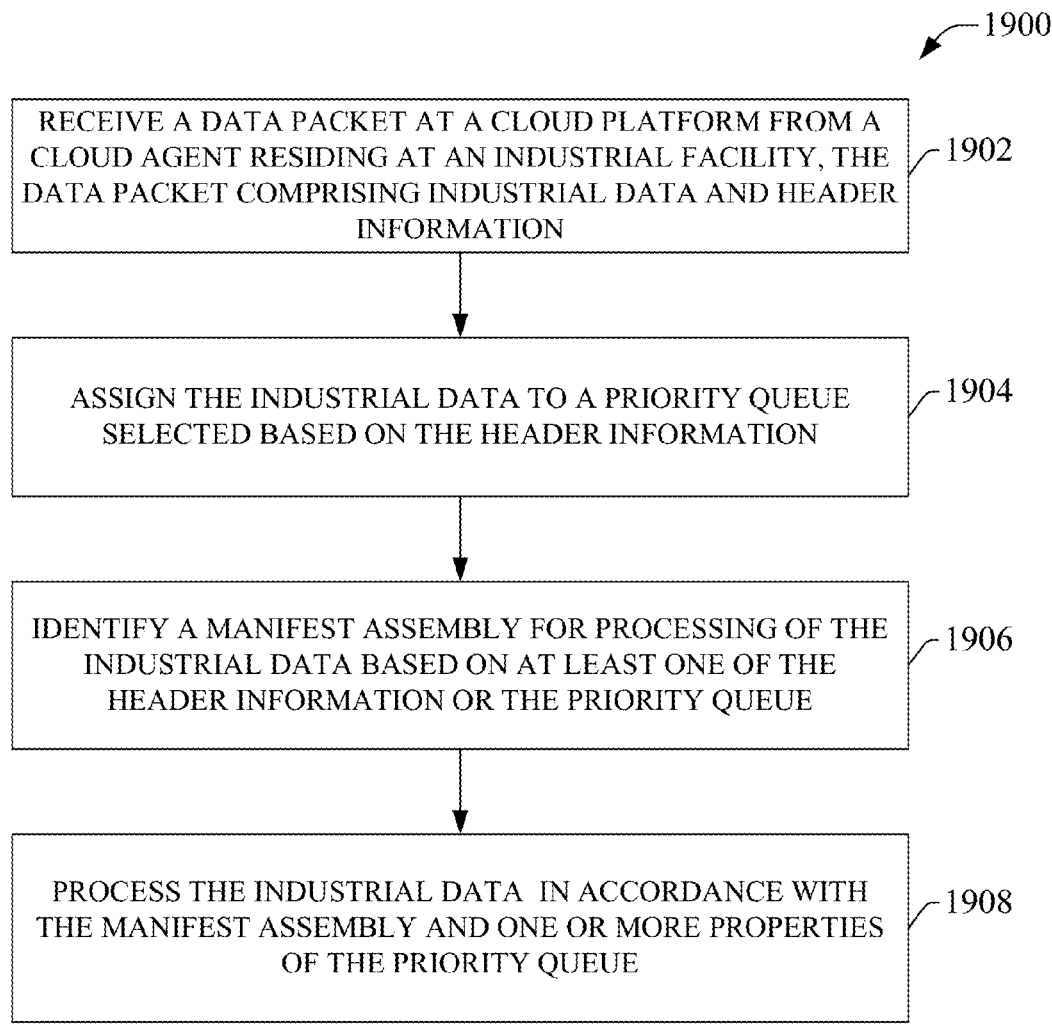
FIG. 19 is a flowchart of an example methodology for receiving and processing industrial data in a cloud platform.

FIG. 19 illustrates an example methodology 1900 for receiving and processing industrial data in a cloud platform. Initially, at 1902, a data packet is received at a cloud platform from a cloud agent residing at an industrial facility. The data packet can comprise industrial data collected from one or more industrial devices at the facility and header information. The header information can include data fields corresponding one or more of a customer identifier, a site identifier a device or virtual support engineer identifier, a processing priority of the industrial data contained in the packet, a message type of the data, a process identifier of a process to be performed on the data, or other such information.

At 1904, the industrial data contained in the data packet is assigned to a customer-specific priority queue in the cloud platform, where the priority queue is selected from multiple available priority queues based on the header information. For example, the priority queue may correspond to the particular message type or process identifier specified in the header information. Accordingly, data processing services executing in the cloud platform can read the header information to determine the message type or process identifier, and assign the industrial data contained in the data packet to the appropriate queue based on this information.

At 1906, a manifest assembly for processing of the industrial data is identified based on at least one of the header information or processing properties associated with the priority queue. For example, a customer's system manifest may be organized into multiple hierarchical levels that correspond to data fields of the header information (see, e.g., FIG. 8), and a particular tag manifest and metrics manifest associated with the system manifest can be identified by navigating the hierarchical structure based on the data field values of the header information. At 1908, the industrial data is processed in accordance with the manifest assembly (e.g., tag manifest and metrics manifest) identified at step 1906 and one or more processing properties of the priority queue (e.g., a processing frequency for the queue, a storage destination defined by the queue, etc.).

Figure 20:
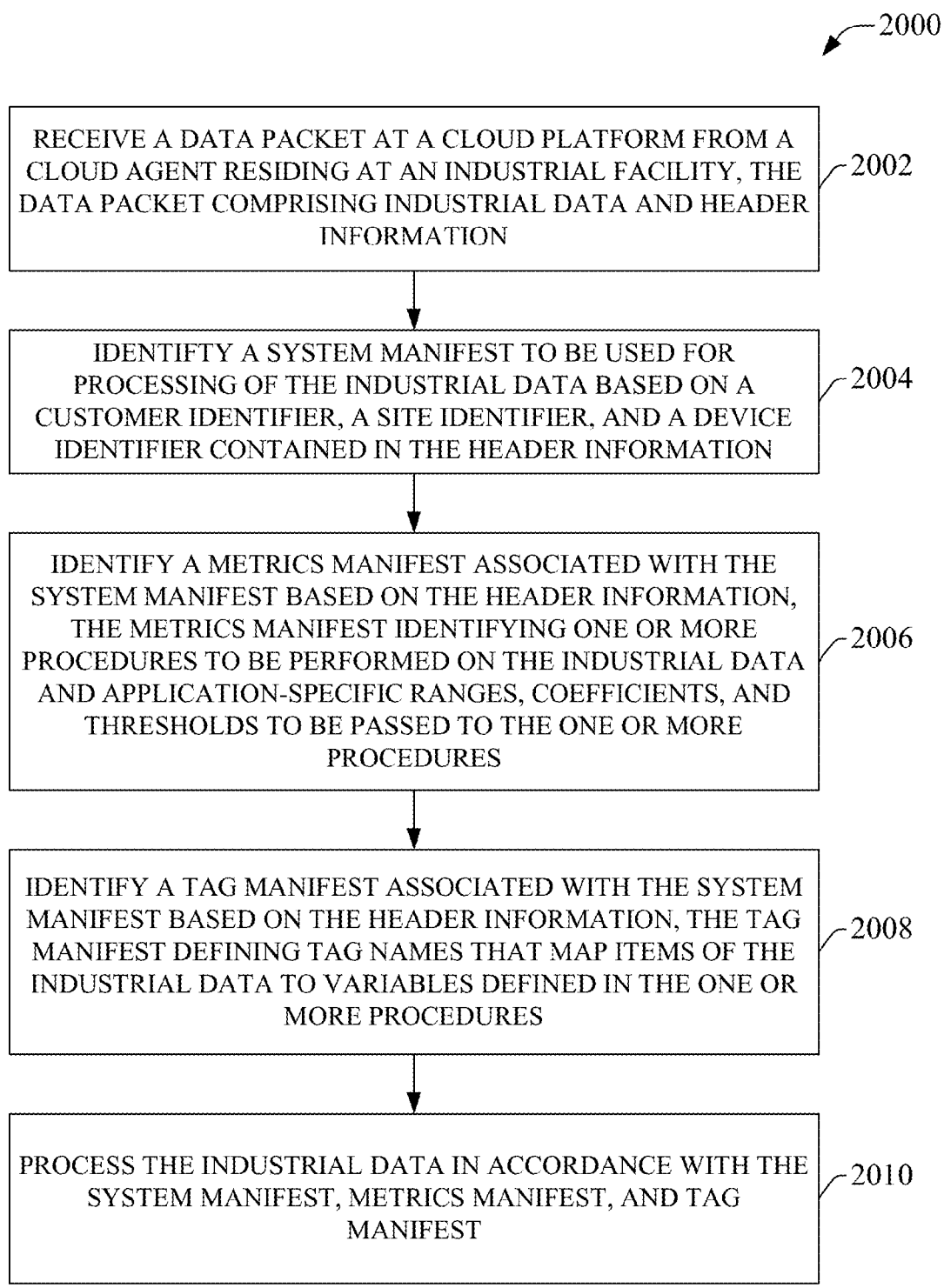
FIG. 20 is a flowchart of an example methodology for selection of a manifest assembly for processing of received industrial data.

FIG. 20 illustrates an example methodology 2000 for selection of a manifest assembly for processing of received industrial data. Initially, at 2002, a data packet is received at a cloud platform from a cloud agent or other on-premise data collection system. The data packet can comprise industrial data collected from one or more industrial devices and header information.

At 2004, a system manifest to be used for processing of the industrial data is identified based on a customer identifier, a site identifier, and a device identifier (or virtual support engineer identifier) contained in the header information. In this regard, the cloud platform may maintain a manifest repository storing system manifests for multiple customers and/or customer facilities. When a data packet is received at the cloud platform, a worker role can read the customer identifier, site identifier, and device identifier contained in the data packet's header and retrieve the appropriate system manifest corresponding to this header information.

At 2006, a metrics manifest associated with the system manifest is identified based on the header information. The metrics manifest identifies one or more procedures to be performed on the industrial data contained in the data packet, and application-specific ranges, coefficients, and thresholds to be passed to the one or more procedures as parameters to facilitate processing of the data. The system manifest may be linked to multiple metrics manifests associated with the customer, and the worker role can select the appropriate metrics manifest based on the header information.

At 2008, a tag manifest associated with the system manifest is identified based on the header information. Like the metrics manifest, the tag manifest can be one of multiple metrics manifests linked to the system manifest, where the particular tag manifest for processing of the data packet is selected based on the data packet's header information. The tag manifest defines tag names that map items of the industrial data contained in the packet (and/or customer data stored in cloud-based storage) to variables defined in the one or more selected procedures. At 2010, the industrial data contained in the data packet is processed in accordance with the system manifest, the metrics manifest, and the tag manifest. This may include, for example, fetching one or more stored generic procedures identified by the manifest assembly, extracting industrial data items identify by the tag manifest from the data packet and/or cloud storage, and processing the industrial data with the retrieved procedures using the ranges, thresholds, and coefficients defined by the metrics manifest as parameters.

Figure 21:
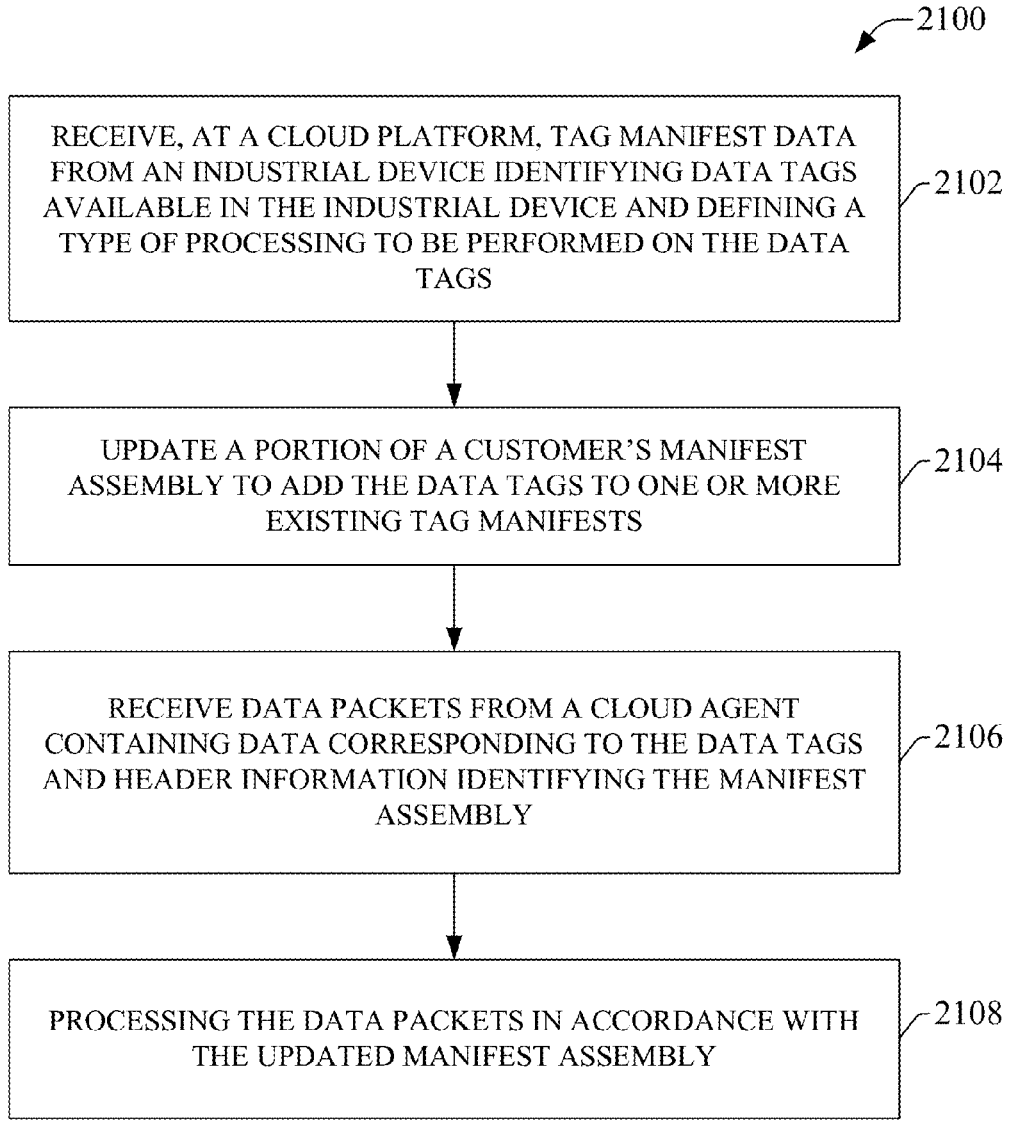
FIG. 21 is a flowchart of an example methodology for remotely updating a customer's manifest assembly on a cloud platform.

FIG. 21 illustrates an example methodology 2100 for remotely updating a customer's manifest assembly on a cloud platform. Initially, at 2102, tag manifest data is received at a cloud platform from an industrial device. The industrial device may be, for example, a new device that has been recently added to a customer's industrial automation system. The tag manifest data identifies data tags available in the industrial device and defines a type of processing to be performed on the data tags. At 2104, a portion of the customer's manifest assembly is updated in the cloud platform to add the data tags identified by the tag manifest data to one or more existing tag manifests stored in a manifest repository.

At 2106, data packets are received from a cloud agent or other on-premise data collection system. The data packets contain industrial data corresponding to the data tags, as well as header information identifying the particular manifest assembly to be used for processing of the industrial data. At 2108, the data packets are processed in accordance with the updated manifest assembly.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 22:
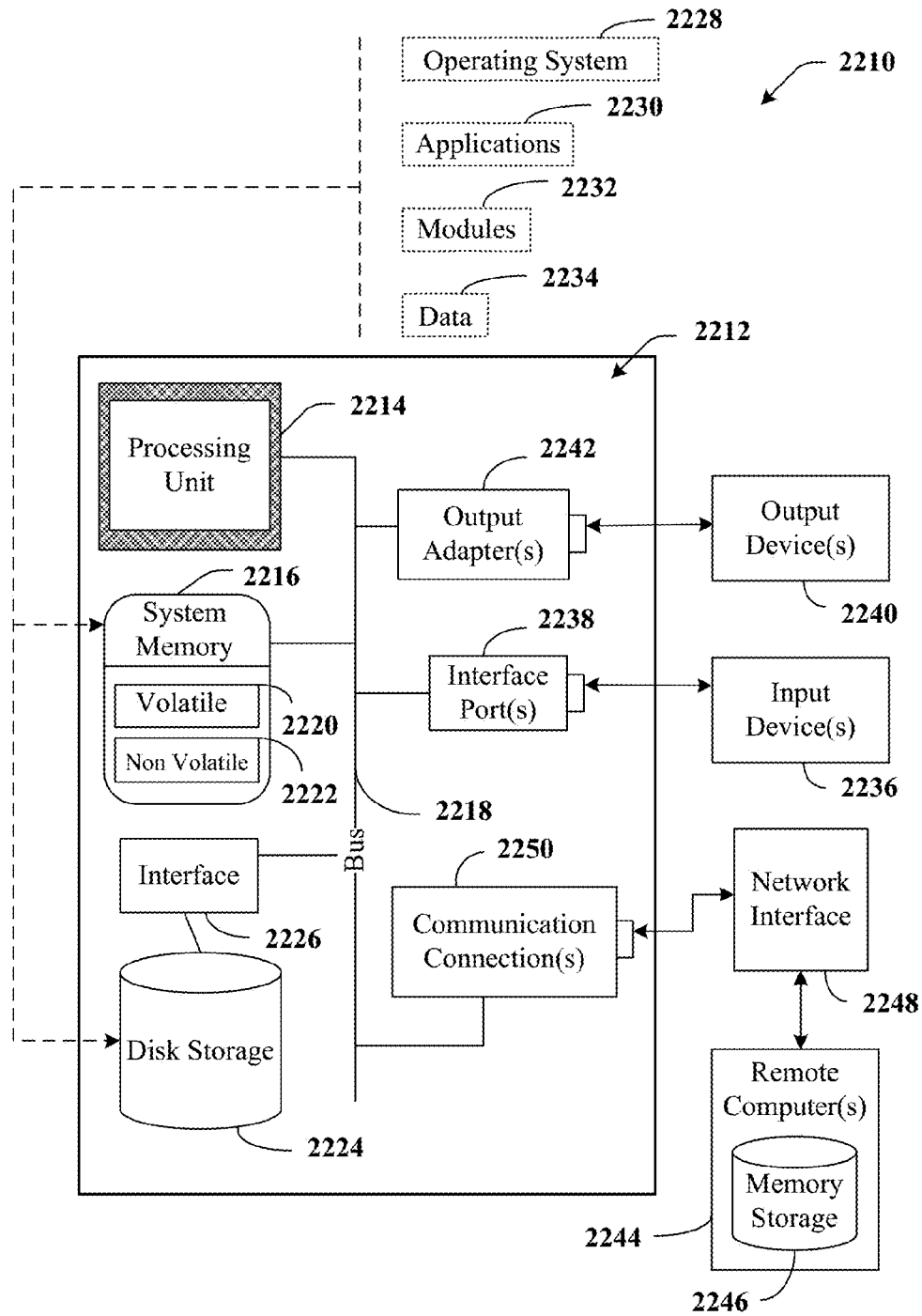
FIG. 22 is an example computing environment.
Figure 23:
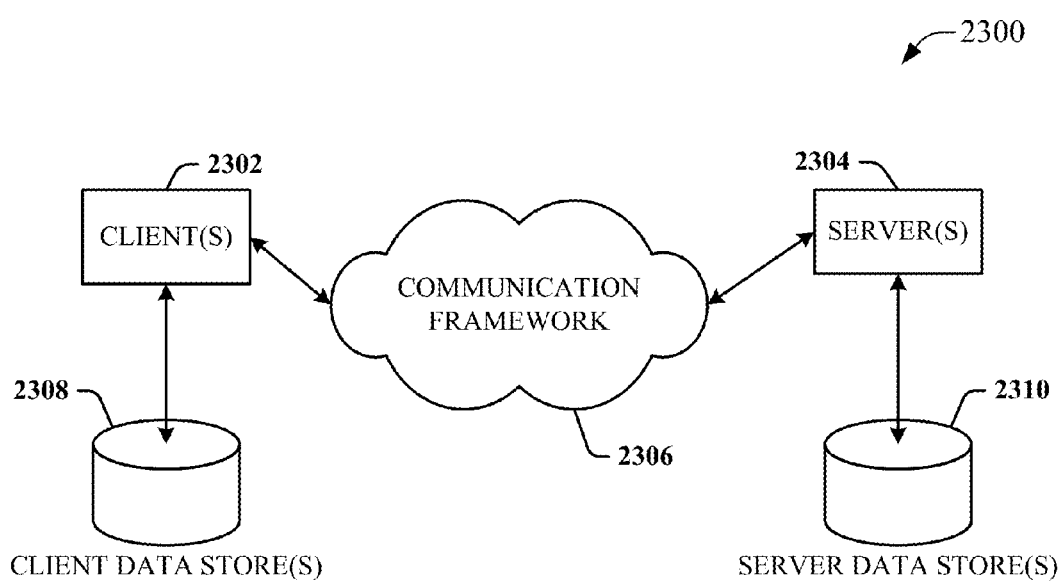
FIG. 23 is an example networking environment.

In order to provide a context for the various aspects of the disclosed subject matter, FIGS. 22 and 23 as well as the following discussion are intended to provide a brief, general description of a suitable environment in which the various aspects of the disclosed subject matter may be implemented.

With reference to FIG. 22, an example environment 2210 for implementing various aspects of the aforementioned subject matter includes a computer 2212. The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Multi-core microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable PROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/non-removable, volatile/non-volatile computer storage media. FIG. 22 illustrates, for example a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer 2212. System applications 2230 take advantage of the management of resources by operating system 2228 through program modules 2232 and program data 2234 stored either in system memory 2216 or on disk storage 2224. It is to be appreciated that one or more embodiments of the subject disclosure can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapters 2242 are provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2250 refers to the hardware/software employed to connect the network interface 2248 to the system bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

FIG. 23 is a schematic block diagram of a sample computing environment 2300 with which the disclosed subject matter can interact. The sample computing environment 2300 includes one or more client(s) 2302. The client(s) 2302 can be hardware and/or software (e.g., threads, processes, computing devices). The sample computing environment 2300 also includes one or more server(s) 2304. The server(s) 2304 can also be hardware and/or software (e.g., threads, processes, computing devices). The servers 2304 can house threads to perform transformations by employing one or more embodiments as described herein, for example. One possible communication between a client 2302 and servers 2304 can be in the form of a data packet adapted to be transmitted between two or more computer processes. The sample computing environment 2300 includes a communication framework 2306 that can be employed to facilitate communications between the client(s) 2302 and the server(s) 2304. The client(s) 2302 are operably connected to one or more client data store(s) 2308 that can be employed to store information local to the client(s) 2302. Similarly, the server(s) 2304 are operably connected to one or more server data store(s) 2310 that can be employed to store information local to the servers 2304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:
1. A system for processing industrial data in a cloud platform, comprising:

a memory that stores executable components;
a processor, operatively coupled to the memory, that executes the executable components, the executable components comprising:
a manifest assembly repository configured to maintain manifest data that defines, for respective priority queues configured in the cloud platform, customer-specific preferences relating to processing of data received at the cloud platform and assigned to the priority queues, wherein the manifest data is uploaded to the cloud platform via a cloud agent device at a plant facility, and wherein the customer-specific preferences define, for respective priority queues of the priority queues, at least a processing priority for the data, an upload frequency for the data, and an indication of a storage location within the cloud storage for the data;
a queue management component configured to receive, at the cloud platform, a data packet from the cloud agent device and assign industrial data contained in the data packet to one of the priority queues selected based on header information contained in the data packet;
a worker role component configured to identify a subset of the manifest data corresponding to the one of the priority queues and defining at least one operation to be performed on the industrial data based on the header information contained in the data packet, and to process the industrial data in the one of the priority queues in accordance with the operation to yield processed data; and
a reporting services component configured to deliver the processed data to a client device in a defined format.

2. The system of claim 1, wherein the header information comprises at least one of a customer identifier field, a site identifier field, a virtual support engineer (VSE) identifier field, a data priority field, a message type field, or a process identifier field.

3. The system of claim 2, wherein the manifest data comprises system manifest data associated with a customer identifier, a site identifier, and a VSE identifier, and wherein the worker role component is configured to identify the subset of the manifest data based on respective values of the customer identifier field, the site identifier field, and the VSE field.

4. The system of claim 3, wherein the system manifest data identifies one or more procedures to be performed on the industrial data, and wherein the worker role component is further configured retrieve the one or more procedures from cloud storage for processing of the industrial data based on information in the system manifest data.

5. The system of claim 4, wherein the system manifest data is linked to one or more sets of tag manifest data that respectively define tag names corresponding to data items to be processed by the one or more procedures, and wherein the worker role component is configured to select a set of tag manifest data, of the one or more sets of tag manifest data, corresponding to the header information of the data packet.

6. The system of claim 5, wherein the worker role component is further configured to extract the data items corresponding to the tag names from at least one of cloud storage or the data packet, and to pass the data items to the one or more procedures for processing.

7. The system of claim 4, wherein the wherein the system manifest data is linked to one or more sets of metrics manifest data that respectively define one or more of a coefficient, a range, or a threshold to be used as a parameter for the one or more procedures.

8. The system of claim 4, wherein the one or more procedures at least one of define a storage destination for the industrial data or define a process for determining a metric based on the industrial data.

9. The system of claim 8, wherein the storage destination is a remote cloud platform, and the one or more procedures cause the worker role to retrieve the industrial data from transient blob storage on the cloud platform and send the industrial data to a remote storage location on a different cloud platform.

10. The system of claim 2, wherein the subset of the manifest data and the header information conform to a common hierarchical architecture.

11. The system of claim 2, wherein the queue management component is further configured to select the one of the priority queues for assignment of the industrial data based on values contained in one or more of the customer identifier field, the site identifier field, the VSE identifier field, the data priority field, the message type field, or the process identifier field.

12. The system of claim 11, wherein the priority queues are associated with respective different processing priority levels.

13. A method for collecting and managing data in a cloud platform, comprising:
receiving, at a cloud platform by a system comprising at least one processor, manifest data from a cloud agent device at a plant facility, the manifest data defining, for respective priority queues configured in the cloud platform, customer-specific preferences relating to processing of data received at the cloud platform and assigned to the respective priority queues, wherein the customer-specific preferences comprise at least a processing priority for the data, an upload frequency for the data, and an indication of a storage location within the cloud storage for the data;
receiving, at the cloud platform by the system, a data packet from the cloud agent device, wherein the data packet comprises a data file containing industrial data and a header;
assigning, by the system, the industrial data to a priority queue of the priority queues selected based on information read from the header;
identifying, by the system, a subset of the manifest data corresponding to the priority queue based on the information read from the header;
processing, by the system, the industrial data in the priority queue in accordance with an operation defined by the subset of the manifest data to yield processed data; and
sending, by the system, the processed data to a client device in accordance with a defined reporting format.

14. The method of claim 13, wherein the identifying the subset of the manifest data comprises identifying the subset of the manifest data based on values of one or more data fields of the header, and wherein the data fields comprise at least one of a customer identifier field, a site identifier field, a virtual support engineer (VSE) identifier field, a data priority field, a message type field, or a process identifier field.

15. The method of claim 13, wherein the processing comprises:
retrieving, from a procedure data store of the cloud platform, one or more stored procedures identified by the header of the data packet; and
processing the industrial data in accordance with the one or more stored procedures.

16. The method of claim 15, wherein the identifying the subset of the manifest data comprises:
identifying tag manifest data that defines one or more data tags corresponding to data items to be provided to the one or more stored procedures; and
identifying metrics manifest data that defines at least one of a coefficient, a range, or a threshold to be used as a parameter of the one or more stored procedures.

17. The method of claim 13, wherein the processing comprises sending the industrial data to a storage destination defined by the set of manifest data, and wherein the destination comprises at least one of a define cloud storage partition, a remote data store, or a remote cloud platform.

18. The method of claim 13, wherein the processing comprises generating a metric relating to an industrial system based on the industrial data.

19. A non-transitory computer-readable medium having stored thereon instructions that, in response to execution, cause a system comprising a processor to perform operations, the operations comprising:
receiving, at a cloud platform, manifest data from a cloud agent device at a plant facility, wherein the manifest data defines, for respective priority queues configured in the cloud platform, customer-specific preferences relating to processing of data received at the cloud platform and assigned to the priority queues, and wherein the customer-specific preferences comprise at least a processing priority for the data, an upload frequency for the data, and an indication of a storage location within the cloud storage for the data;
receiving, at the cloud platform, a data packet from the cloud agent device, wherein the data packet comprises a data file containing industrial data and header information;
selecting a priority queue, of a the priority queues, based on the header information;
assigning the industrial data to the priority queue;
selecting, based on the header information, a subset of the manifest data corresponding to the priority queue;
processing the industrial data in the priority queue according to processing instructions specified by the subset of the manifest data to yield processed data; and
sending the processed data to a client device in a defined reporting format.

20. The non-transitory computer-readable medium of claim 19, wherein the selecting the subset of the manifest data comprises:
selecting system manifest data based on one or more of a customer identifier, a site identifier, or a virtual support engineer (VSE) identifier contained in the header information, wherein the system manifest data defines one or more procedures to be applied to the industrial data;
navigating a hierarchical structure of the system manifest data based on the header information to identify tag manifest data that defines one or more data tags to be processed by the one or more procedures; and
navigating the hierarchical structure based on the header information to identify metrics manifest data that defines one or more parameters for execution of the one or more procedures, wherein the one or more parameters comprise at least one of a coefficient, a threshold, or a range.

* * * * *